US012771519B2

(12) United States Patent
Jin

(10) Patent No.: US 12,771,519 B2
(45) Date of Patent: Oct. 20, 2026

(54) METHOD AND DEVICE FOR ACTIVATING PDCCH RECEPTION BEAM FOR MULTIPLE CARRIERS SIMULTANEOUSLY IN MOBILE COMMUNICATION SYSTEM

(71) Applicant: Samsung Electronics Co., Ltd., Gyeonggi-do (KR)

(72) Inventor: Seungri Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 302 days.

(21) Appl. No.: 18/569,879

(22) PCT Filed: Jul. 6, 2022

(86) PCT No.: PCT/KR2022/009763
§ 371 (c)(1),
(2) Date: Dec. 13, 2023

(87) PCT Pub. No.: WO2023/282623
PCT Pub. Date: Jan. 12, 2023

(65) Prior Publication Data

US 2024/0283623 A1 Aug. 22, 2024

(30) Foreign Application Priority Data

Jul. 7, 2021 (KR) ........................ 10-2021-0089214

(51) Int. Cl.
*H04L 5/00* (2006.01)
*H04W 72/23* (2023.01)

(52) U.S. Cl.
CPC .......... *H04L 5/0098* (2013.01); *H04L 5/0053* (2013.01); *H04W 72/23* (2023.01)

(58) Field of Classification Search
CPC ..... H04L 5/0098; H04L 5/0053; H04L 5/001; H04L 5/0023; H04W 72/23; H04W 80/02; H04W 72/0453; H04W 72/046; H04W 72/20; H04B 7/024; H04B 7/0404;
(Continued)

(56) References Cited

U.S. PATENT DOCUMENTS

| | | | |
|---|---|---|---|
| 11,564,229 | B2 | 1/2023 | Jin et al. |
| 2021/0105860 | A1 | 4/2021 | Tsai et al. |
| 2021/0119741 | A1 | 4/2021 | Zhou et al. |

(Continued)

FOREIGN PATENT DOCUMENTS

| | | |
|---|---|---|
| KR | 10-2022-0075337 | 6/2022 |
| WO | WO 2020/146737 | 7/2020 |

OTHER PUBLICATIONS

PCT/ISA/210 Search Report dated Sep. 29, 2022, issued on PCT/KR2022/009763, pp. 6.

(Continued)

*Primary Examiner* — Jung H Park
(74) *Attorney, Agent, or Firm* — The Farrell Law Firm, P.C.

(57) ABSTRACT

The present invention relates to a method and device for activating a PDCCH reception beam for multiple carriers simultaneously, on the basis of an RRC message comprising a first list and a second list which are lists of serving cells to which update of a TCI state is to be simultaneously applied, and a MAC CE comprising an identifier of the serving cells, an identifier of a CORESET, and an identifier of a TCI state.

15 Claims, 20 Drawing Sheets

(58) Field of Classification Search
CPC .............. H04B 7/0421; H04B 7/06952; H04B 7/06968; H04B 7/088
See application file for complete search history.

(56) References Cited

U.S. PATENT DOCUMENTS

| | | | | |
|---|---|---|---|---|
| 2022/0376851 | A1* | 11/2022 | Noh | H04L 5/001 |
| 2023/0319839 | A1* | 10/2023 | Nilsson | H04L 5/0053 370/329 |
| 2024/0098520 | A1* | 3/2024 | Liu | H04B 7/06968 |

OTHER PUBLICATIONS

PCT/ISA/237 Written Opinion dated Sep. 29, 2022, issued on PCT/KR2022/009763 pp. 4.

ZTE Corporation, Sanechips, "MAC CE enhancement to support two TCI states for PDCCH", 3GPP TSG-RAN WG2 Meeting#114 R2-2105858 Electronic, May 19-May 27, 2021, pp. 4.

Huawei, HiSilicon, "Introduction of capability bit for multi-CC simultaneous TCI activation with multi-TRP", 3GPP TSG-RAN WG2 Meeting #112-e R2-2010889 Electronic Meeting, Nov. 2-13, 2020, pp. 14.

Moderator (LG Electronics), "Summary of [105-e-NR-eMIMO-01]", R1-2105987, 3GPP TSG RAN WG1 #105-e, May 10-27, 2021, 8 pages.

Xiaomi Communications, "Enhanced TCI State Indication for UE-Specific PDCCH MAC CE" R2-2105731, 3GPP TSG-RAN WG2 Meeting #114 electronic, May 19-27, 2021, 7 pages.

European Search Report dated Oct. 18, 2024 issued in counterpart application No. 22837975.6-1206, 13 pages.

Korean Office Action dated Apr. 28, 2026 issued in counterpart application No. 10-2021-0089214, 11 pages.

* cited by examiner

METHOD AND DEVICE FOR ACTIVATING PDCCH RECEPTION BEAM FOR MULTIPLE CARRIERS SIMULTANEOUSLY IN MOBILE COMMUNICATION SYSTEM

PRIORITY

This application is a National Phase Entry of PCT International Application No. PCT/KR2022/009763, which was filed on Jul. 6, 2022, and claims priority to Koren Patent Application No. 10-2021-0089214, which was filed on Jul. 7, 2021, the entire content of each of which is incorporated herein by reference.

TECHNICAL FIELD

The present disclosure relates to a mobile communication system and, more particularly, to a method and an apparatus in use by a terminal and a base station that activate a beam for receiving a Physical Downlink Control Channel (PDCCH) with respect to many carriers in a mobile communication system.

BACKGROUND ART 5G mobile communication technologies define broad frequency bands that ensure fast transfer speeds and new services. These technologies can be expected to operate in an Ultra High Frequency band ('above 6 Ghz') referred to as a mmWave band, such as 28 GHz and 39 GHz frequency bands, as well as a 6 GHz or lower ('sub 6 GHz') frequency band, such as a 3.5 GHz frequency band. In addition, in order to achieve a transfer speed that is 50 times faster than in the 5G mobile communication technologies and an ultra-low latency time that is reduced by one tenth, it is considered that 6G mobile communication technologies, referred to as beyond-5G communication systems, are expected to operate in a terahertz frequency band (for example, ranging from 95 GHz to 3 THz).

In the early stage of the 5G mobile communication technologies, goals were established to provide service support for and satisfy performance requirements for enhanced Mobile Broadband (eMBB), Ultra-Reliable Low-Latency Communication (URLLC), massive Machine-Type Communications (mMTC). To accomplish these goals, standardization of the following aspects has been under development: beamforming and massive MIMO for alleviating path loss experienced by a radio wave in an Ultra High Frequency band and for increasing the distance over which the radio wave is transferred; support of various types of numerology for efficient utilization of Ultra High Frequency resources (management of spacing between a plurality of subcarriers and the like) and dynamic management for slot formats; initial access technologies for supporting multiple beam transfer and broadband communication; definition and management of a Band-Width Part (BWP); new channel coding schemes, such as a Low Density Parity Check (LDPC) code for transferring high-volume data and a polar code for transferring control information in a high reliability manner; L2 pre-processing; and network slicing that provides a dedicated network specific to a specific service, among others.

Currently, discussions are underway to improve the initial 5G mobile communication technologies and enhance their performance, taking into consideration services that the 5G mobile communication technologies have been intended to support. Physical layer standardization for the following technologies is underway: Vehicle-to-Everything (V2X) for assisting autonomous driving vehicles in making traveling determinations based on their locations and state information transferred by other vehicles, thereby increasing user convenience; New Radio Unlicensed (NR-U), aimed at performing a system operation in compliance with regulatory requirements in unlicensed bands; UE power saving; Non-Terrestrial Network (NTN) over which to perform direct communication between a UE and a satellite to provide coverage in areas where communication over a terrestrial network is impossible; and positioning, among others.

Moreover, standardization of the following technologies in the wireless interface architecture/protocol field is also underway: Industrial Internet of Things (IIoT) for supporting new services in conjunction with or in combination with other industrial fields; Integrated Access and Backhaul (IAB) providing a node for expanding a network service area by integrally supporting a wireless backhaul link and an access link; mobility enhancement that encompasses aspects such as a conditional handover and a Dual Active Protocol Stack (DAPS) handover; and 2-step random access (2-step RACH for NR) simplifying a random access procedure, among others. Furthermore, the standardization of the following aspects in the system architecture/service field is also underway: 5G baseline architectures (for example, a service-based architecture and a service-based interface) for combination of Network Functions Virtualization (NFV) and Software-Defined Networking (SDN) technologies; and Mobile Edge Computing (MFC) provided with services based on UE locations, among others.

With the commercialization of 5G mobile communication systems as described above, the number of connected apparatuses is trending towards increasing exponentially, with these apparatuses being connected to a communication network. Accordingly, it is anticipated that there will be a need to enhance the functions and performance of the 5G mobile communication systems and to manage the connected apparatuses in an integrated manner. To this end, new research is going to be conducted on improving 5G performance, reducing complexity, supporting AI services, supporting metabus services, and ensuring reliable drone communication, among others, by utilizing extended Reality (XR) for efficiently supporting Augmented Reality (AR), Virtual Reality (VR), Mixed Reality (MR), and the like, and by utilizing Artificial Intelligence (AI) and Machine Learning (ML).

In addition, advancements in this 5G mobile communication system will provide a foundation for developments in multiple antenna transmission technologies, high-dimensional spatial multiplexing technologies, and Reconfigurable Intelligent Surface (RIS) technologies. The multiple antenna transmission technologies, such as a new waveform, Full Dimensional MIMO (FD-MIMO), an array antenna, and a large-scale antenna, aim to ensure coverage in a terahertz frequency band for use in 6G mobile communication technologies. The high-dimensional spatial multiplexing technologies use a metamaterial-based lens and antenna, and Orbital Angular Momentum (OAM) in order to improve signal coverage in the terahertz frequency band. Furthermore, the advancements in the 5G mobile communication system will provide a foundation for developments in full duplex technologies, AI-based communication technologies, and next-generation distributed computing technologies, among others. The full-duplex technologies aim to improve frequency efficiency for the 6G mobile communication technologies and to enhance the robustness of a system network. The AI-based communication technologies utilize a satellite and artificial intelligence (AI), starting from a design phase, and embed an end-to-end AI support function, thereby enabling the realization of system optimization. The next-generation distributed computing technologies enable the realization of complex services that transcend the limitations of the UE's computational capability, by utilizing high-performance communication and computing resources.

DISCLOSURE OF INVENTION

Technical Problem

The present disclosure is directed to an operation of configuring and activating beam information (a Transmission Configuration Indicator (TCI) state) that is used by a UE during PDCCH reception in a mobile communication system. In case where only activation/deactivation of a beam (the TCI state) with respect to a BandWidth Part (BWP) within one serving cell is possible, in a state where carrier aggregation (CA) is configured, an operation of indicating the activation/deactivation needs to be sequentially repeated many times in order to activate the beam with respect to a plurality of carriers and BWPs. Consequently, a problem arises in that a latency time increases and signaling overhead increases.

Solution to Problem

In order to solve the above-mentioned problem, according to one aspect of the present disclosure, there is provided a method performed by a terminal in a communication system, the method including: receiving, from a base station, a radio resource control (RRC) message containing a first list and a second list that are lists for serving cells to which to apply simultaneously an update of a transmission configuration indicator (TCI) state; receiving, from the base station, a medium access control (MAC) control element (CE) containing a serving cell identifier, a control resource set (CORESET) identifier, and a TCI state identifier; and receiving, from the base station, a Physical Downlink Control Channel (PDCCH) by applying the TCI state to all cells in the list in which a serving cell is contained, in case where the serving cell indicated by the MAC CE is contained in the first list or the second list.

In order to solve the above-mentioned problem, according to another aspect of the present disclosure, there is provided a method performed by a base station in a communication system, the method including: transferring, to a terminal, a radio resource control (RRC) message containing a first list and a second list that are lists for serving cells to which to apply simultaneously an update of a transmission configuration indicator (TCI) state; transferring, to the terminal, a medium access control (MAC) control element (CE) containing a serving cell identifier, a control resource set (CORESET) identifier, and a TCI state identifier; and transferring, to the terminal, a Physical Downlink Control Channel (PDCCH) by applying the TCI state to all cells in the list in which a serving cell is contained, in case where the serving cell indicated by the MAC CE is contained in the first list or the second list.

In order to solve the above-mentioned problem, according to still another aspect of the present disclosure, there is provided a terminal in a communication system, the terminal including: a transceiver; and a controller connected to the transceiver, wherein the controller receives, from a base station, a radio resource control (RRC) message containing a first list and a second list that are lists for serving cells to which to apply simultaneously an update of a transmission configuration indicator (TCI) state, receives, from the base station, a medium access control (MAC) control element (CE) containing a serving cell identifier, a control resource set (CORESET) identifier, and a TCI state identifier, and receive, from the base station, a Physical Downlink Control Channel (PDCCH) by applying the TCI state to all cells in the list in which a serving cell is contained, in case where the serving cell indicated by the MAC CE is contained in the first list or the second list.

In order to solve the above-mentioned problem, according to yet another aspect of the present disclosure, there is provided a base station in a communication system, the bast station including: a transceiver; and a controller connected to the transceiver, wherein the controller transfers, to a terminal, a radio resource control (RRC) message containing a first list and a second list that are lists for serving cells to which to apply simultaneously an update of a transmission configuration indicator (TCI) state, transfers, to the terminal, a medium access control (MAC) control element (CE) containing a serving cell identifier, a control resource set (CORESET) identifier, and a TCI state identifier, and transfers, to the terminal, a Physical Downlink Control Channel (PDCCH) by applying the TCI state to all cells in the list in which a serving cell is contained, in case where the serving cell indicated by the MAC CE is contained in the first list or the second list.

Advantageous Effects of Invention

According to the present disclosure, in a mobile communication system, in a state where CA is configured, a plurality of pieces of beam information that applies to PDCCH reception configured in many serving cells and BWPs in each of the many serving cells can be simultaneously activated. Thus, a latency time during which a corresponding configuration applies can be reduced, thereby reducing signaling overhead for this configuration.

MODE FOR THE INVENTION

Hereinafter, the operating principle of the present disclosure will be described in detail with reference to the accompanying drawings. In describing the present disclosure below, detailed descriptions of well-known functions or constituent elements associated with the present disclosure will be omitted if they unnecessarily obscure the nature and gist of the present disclosure. In addition, terms defined based on the meanings of constituent elements they refer to in the present disclosure will be used below and may vary according to the user's or manager's intention or according to prevailing practices in the art. Therefore, these terms should be defined in light of the content within the present specification. Terms for identifying access nodes, terms that refer to network entities, terms that refer to messages, terms that refer to interfaces between network entities, and terms that refer to various pieces of identification information, among others, are used below. These terms are provided as examples for the convenience of description. Therefore, the present disclosure is not limited to the terms used below, and another term that refers to an object having an equivalent technical meaning may be used.

In the present disclosure, terms and names that are defined by 3rd Generation Partnership Project Long Term Evolution (3GPP LTE) standards are used below for convenience of description. However, the present disclosure is not limited to these terms and names, and may apply in the same manner to systems that comply with other standards.

Figure 1:
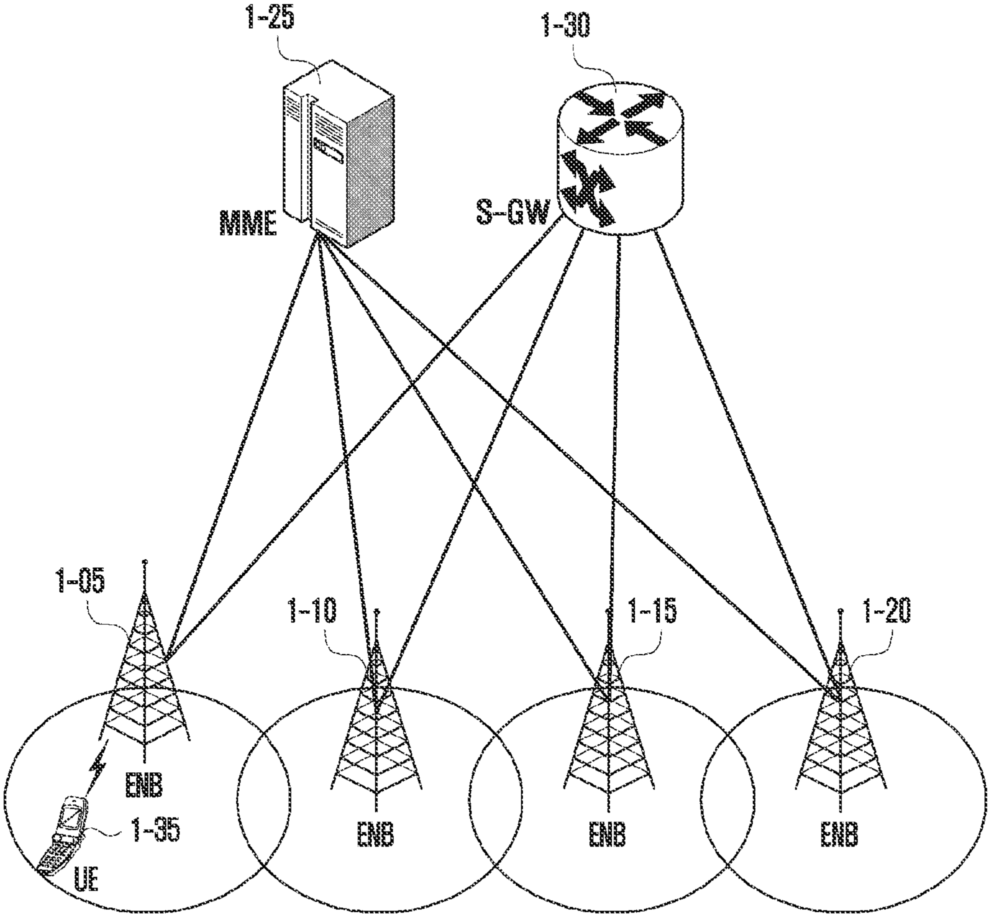
FIG. 1 is a diagram illustrating a structure of an LTE system that is referred to for description of the present disclosure.

FIG. 1 is a diagram illustrating a structure of an LTE system that is referred to for description of the present disclosure.

With reference to FIG. 1, as illustrated, a radio access network for the LTE system is constituted to include evolved Nodes B (each of which is hereinafter referred to as an eNB, a Node B, or a base station) 1-05, 1-10, 1-15, and 1-20, a mobility management entity (MME) 1-25, and a serving-gateway (S-GW) 1-30. A user equipment (hereinafter referred to as a UE or a terminal) 1-35 has access to an external network through the eNBs 1-05 to 1-20 and the S-GW 1-30.

In FIG. 1, the eNBs 1-05 to 1-20 correspond to existing Node Bs, respectively, in a UMTS system. The eNB establishes a connection to the UE 1-35 over a radio channel and performs a more complex role than an existing Node B. In the LTE system, all types of user traffic, including real-time services like Voice over IP (VOIP) through Internet protocols, are serviced over a shared channel. Accordingly, there is a need for a device that collects and schedules state information of the UEs, such as a buffer state, an available transfer power state, and a channel state. The eNBs 1-05 to 1-20 are responsible for collecting and scheduling of this state information. Normally, one eNB controls a multiplicity of cells. For example, in order to achieve a transfer speed of 100 Mbps, the LTE system uses, for example, Orthogonal Frequency Division Multiplexing (hereinafter referred to as OFDM) as a radio access technology in a bandwidth of 20 MHz. In addition, an Adaptive Modulation & Coding (hereinafter referred to as "AMC") scheme that determines a modulation scheme and a channel coding rate in accordance with the channel state of the UE applies to the LTE system. The S-GW 1-30 is a device that provides a data bearer. The S-GW 1-30 generates or controls the data bearer under the control of the MME 1-25. The MME, which serves as a device responsible for performing various control functions, as well as a mobility management function, with respect to the UE, establishes connections to a multiplicity of eNBs.

Figure 2:
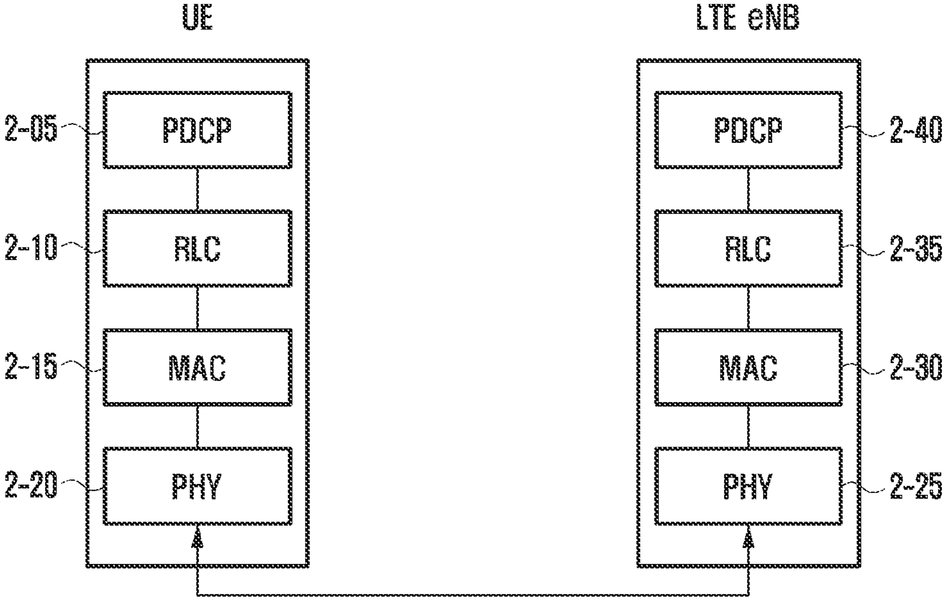
FIG. 2 is a diagram illustrating a wireless protocol structure in the LTE system that is referred to for the description of the present disclosure.

FIG. 2 is a diagram illustrating a wireless protocol structure in the LTE system that is referred to for the description of the present disclosure.

With reference to FIG. 2, wireless protocols for the LTE system include Packet Data Convergence Protocol (PDCP) 2-05, Radio Link Control (RLC) 2-10, and Medium Access Control (MAC) 2-15 in the UE and PDCP 2-40, RLC 2-35, and MAC 2-30 in the eNB. The PDCPs 2-05 and 2-40 are responsible for performing operations such as IP header compression/restoration. The primary functions of the PDCP are summarized as follows.

Header compression and decompression: ROHC only

Transfer of user data

In-sequence delivery of upper layer PDUs at PDCP re-establishment procedure for RLC AM

- For split bearers in DC (only support for RLC AM): PDCP PDU routing for transmission and PDCP PDU reordering for reception
- Duplicate detection of lower layer SDUs at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink Radio Link Controls (hereinafter also referred to as RLC) 2-10 and 2-35 readjust a PDCP Packet Data Unit (PDU) to a suitable size and perform an ARQ operation and the like. The primary functions of the RLC are summarized as follows.

- Transfer of upper layer PDUs
- Error Correction through ARQ (only for AM data transfer)
- Concatenation, segmentation and reassembly of RLC SDUs (only for UM and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MACs 2-15 and 2-30, which are connected to many RLC layer entities constituted within one UE, multiplex RLC PDUs onto a MAC PDU and perform an operation of demultiplexing the RLC PDUs from the MAC PDU. The primary functions of the MAC are summarized as follows.

- Mapping between logical channels and transport channels
- Multiplexing/demultiplexing of MAC SDUs belonging to one or different logical channels into/from transport blocks (TB) delivered to/from the physical layer on transport channels)
- Scheduling information reporting
- Error correction through HARQ
- Priority handling between logical channels of one UE
- Priority handling between UEs by means of dynamic scheduling
- MBMS service identification
- Transport format selection
- Padding Physical layers 2-20 and 2-25 channel-code and modulate higher layer data for conversion into OFDM symbols and transfer the resulting OFDM symbols over a radio channel. Alternatively, the physical layers 2-20 and 2-25 demodulate and channel-decode the OFDM symbols received over a radio channel and perform an operation of delivering the resulting higher layer data to a higher layer. In addition, a Hybrid ARQ (HARQ) may also be used in the physical layer for additional error correction. The receiving side transfers to the transferring side a one-bit signal to acknowledge the successful or unsuccessful reception of a packet transferred from the transmitting side. This one-bit signal is referred to as HARQ ACK/NACK information. Downlink HARQ ACK/NACK information for uplink transfer may be transferred over a Physical Hybrid-ARQ Indicator Channel (PHICH). Uplink HARQ ACK/NACK information for downlink transfer may be transferred over a Physical Uplink Control Channel (PUCCH) or a Physical Uplink Shared Channel (PUSCH).

On the other hand, the PHY layer may be comprised of one frequency/carrier wave or a plurality of frequencies/carrier waves. A technology that simultaneously configures and uses the plurality of frequencies is referred to as carrier aggregation (hereinafter referred to as CA). For communication between the terminal (user equipment (UE)) and the base station (E-UTRAN NodeB (eNB)), the CA additionally uses a primary carrier wave, and one secondary carrier wave or a plurality of secondary carrier waves, instead of using only one carrier wave as was the case before. Thus, the CA can significantly increase an amount of transfer as much as the number of secondary carrier waves. On the other hand, in LTE, a cell within the eNB that uses the primary carrier wave is referred to a primary cell (Pcell), and the secondary carrier wave is referred to as a secondary cell (SCell).

Although not illustrated in the drawings, Radio Resource Control (hereinafter referred to as RRC) layers are present on top of respective PDCP layers in the UE and the eNB. The RRC layers can transmit and receive a configuration control message associated with access and measurement in order to perform radio resource control.

Figure 3:
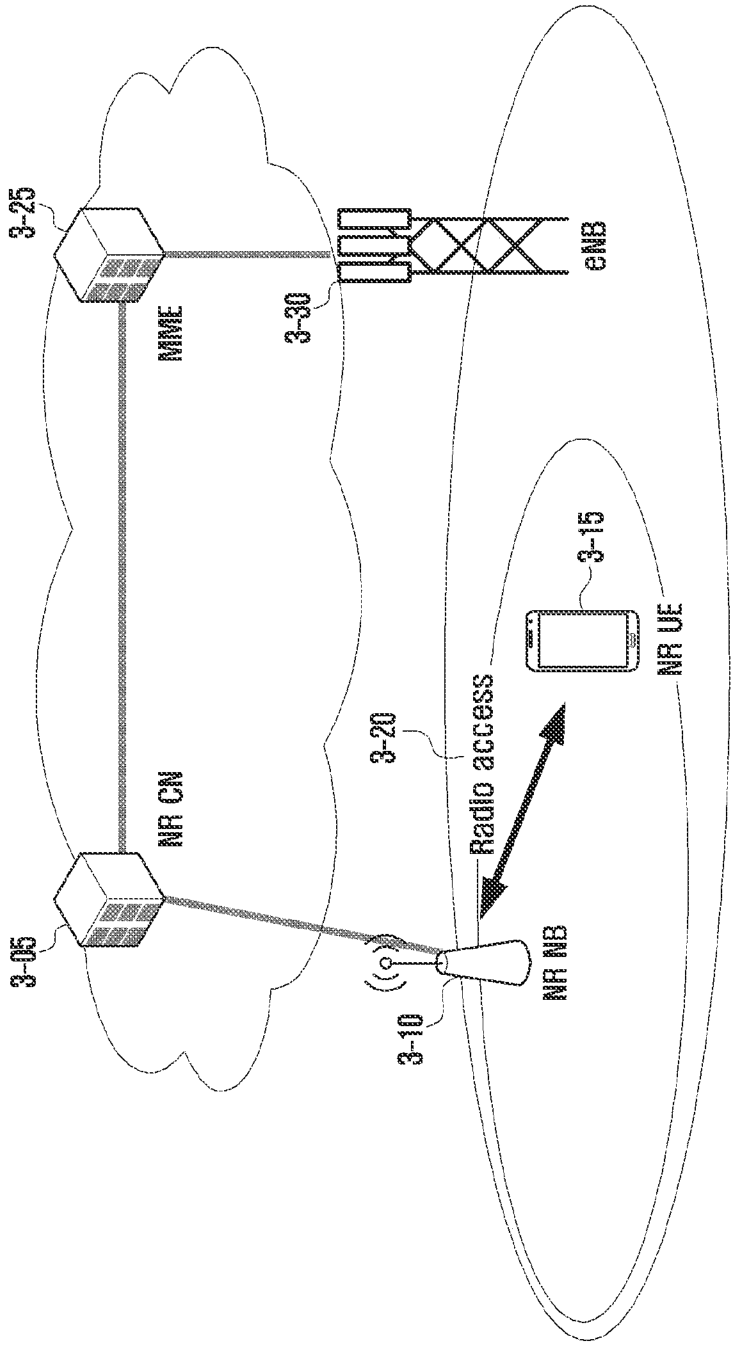
FIG. 3 is a diagram illustrating a structure of a next-generation mobile communication system in which the present disclosure finds application.

FIG. 3 is a diagram illustrating a structure of a next-generation mobile communication system in which the present disclosure finds application.

With reference to FIG. 3, as illustrated, a radio access network for the next-generation mobile communication system is constituted to include a New Radio Node B (hereinafter referred to as a NR NB) 3-10 and a New Radio Core Network (NR CN) or a Next Generation Core Network (NG CN) 3-05. A New Radio User Equipment (hereinafter referred to as a NR UE or a UE) 3-15 has access to an external network through the NR NB 3-10 and the NR CN 3-05.

The NR NB 3-10 in FIG. 3 corresponds to the evolved Node B (eNB) in an existing LTE system. The NR NB 3-10 establishes a connection to the NR UE 3-15 over a radio channel and can provide a service that surpasses that of the existing Node B. In the next-generation mobile communication system, all types of user traffic are serviced over a shared channel.

Figure 4:
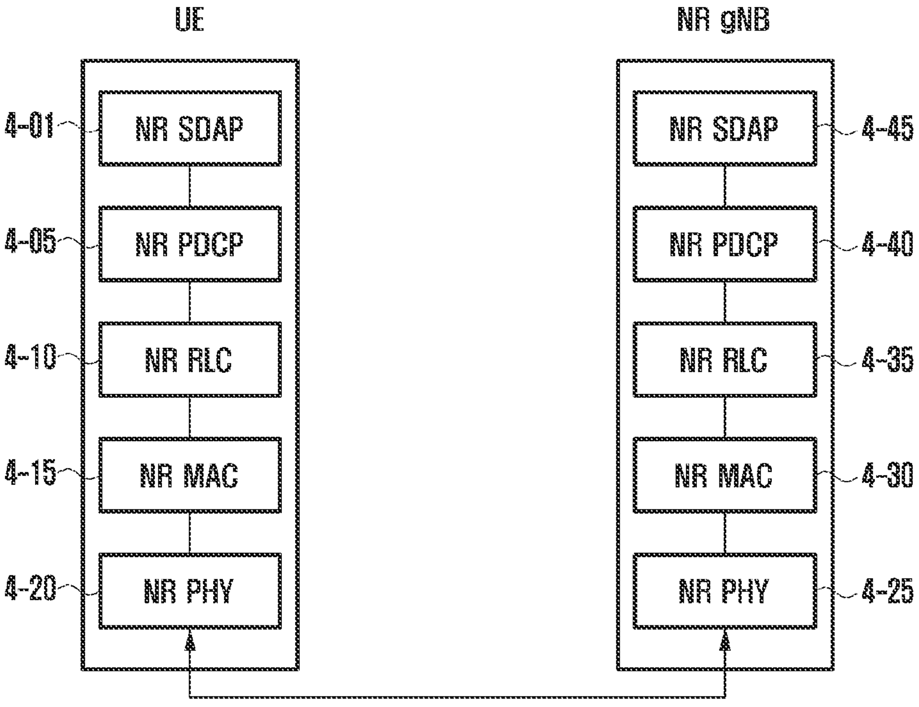
FIG. 4 is a diagram illustrating a structure of a wireless protocol for the next-generation mobile communication system in which the present disclosure finds application.

Accordingly, there is a need for a device that collects and schedules state information of the UEs, such as a buffer state, an available transfer power state, and a channel state. The NR NB 3-10 is responsible for collecting and scheduling of this state information. Normally, one NR NB controls a multiplicity of cells. In order to achieve an ultra-fast data transfer when compared with the existing LTE, the next-generation mobile communication system can use Orthogonal Frequency Division Multiplexing (hereinafter referred to as OFDM) as a radio access technology in a bandwidth reaching or exceeding an existing maximum bandwidth and additionally can use a beamforming technology that is applicable thereto. In addition, the Adaptive Modulation & Coding (hereinafter referred to as "AMC") scheme that determines the modulation scheme and the channel coding rate in accordance with the channel state of the UE applies to the LTE system. The NR CN 3-05 performs functions such as mobility support, bearer configuration, and QoS configuration. The NR CN 3-05 is a device responsible for performing various control functions, as well as mobility management, with respect to the NR UE 3-15. The NR CN 3-05 establishes connections to a multiplicity of NR-NBs 3-10. In addition, the next-generation mobile communication system may also operate in conjunction with the existing LTE system, and the NR CN 3-05 establishes a connection to the MME 3-25 through a network interface. The MME 3-25 establishes a connection to an eNB 3-30 that is an existing base station. FIG. 4 is a diagram illustrating a structure of a wireless protocol for the next-generation mobile communication system in which the present disclosure finds application.

With reference to FIG. 4, the wireless protocol for the next-generation mobile communication system is comprised of a NR SDAP 4-01, a NR PDCP 4-05, a NR RLC 4-10, and a NR MAC 4-15 in the UE and is comprised of a NR SDAP 4-45, a NR PDCP 4-40, a NR RLC 4-35, and a NR MAC 4-30 in the NR gNB.

The primary functions of each of the NR SDAPs 4-01 and 4-45 may include one or several of the following functions.

Transfer of user plane data

Mapping between a QoS flow and a DRB for both DL and UL

Marking QoS flow ID in both DL and UL packets

Reflective QoS flow to DRB mapping for the UL SDAP PDUs

As for a SDAP layer entity, with an RRC message, the UE may be configured in such a manner as to determine whether or not to use a header of the SDAP layer entity or whether or not to use a function of the SDAP layer entity on a per-PDCP layer entity basis, on a per-bearer basis, or on a per-logical channel basis. In case where a SDAP header is configured, the UE may be instructed to update or reconfigure information on mapping between a QoS flow and a data bearer for uplink and downlink, using a one-bit indicator, for configuring NAS reflective QoS, of the SDAP header and a one-bit indicator, for configuring AS reflective QoS, of the SDAP header. The SDAP header may contain QoS flow ID information indicating QoS. The QoS information may be used as data process priority, scheduling information, and the like for supporting a seamless service.

Primary functions of each of the NR PDCPs 4-05 and 4-40 may include one or several of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering by a NR PDCP entity refers to sequentially reordering the PDCP PDUs, received in a lower layer, on the basis of a PDCP sequence number (SN). The reordering may include delivering data to a higher layer in reordered sequence or delivering the data as is, without considering ordering. Furthermore, the reordering may include recording the lost PDCP PDUs by reordering, reporting a state of the lost PDCP PDUs to the transmitting side, and making a request for retransmitting PDCP PDUs that are replacements of the lost PDCP PDUs.

Primary functions of each of the NR RLCs 4-10 and 4-35 may include one or several of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery by a NR RLC entity refers to sequentially delivering the RLC SDUs received from a lower layer to a higher layer. The in-sequence delivery may include reassembling many received RLC SDUs that result from segmenting a single original RLC SDU, and then delivering the reassembled original RLC SDU and may include reordering the received RLC PDUs on the basis of an RLC sequence number (SN) or a PDCP sequence number (SN). Furthermore, the in-sequence delivery may include recording the lost RLC PDUs by reordering and reporting a state of the lost RLC PDUs to the transmitting side and making a request for retransmitting RLC PDUs that are replacements of the lost RLC PDUs. Furthermore, the in-sequence delivery may include sequentially delivering to a higher layer only the received RLC SDUs preceding the lost RLC SDUs. Alternatively, the in-sequence delivery may include sequentially delivering to the higher layer all the RLC SDUs received before a timer starts, when a predetermined timer expires even if the RLC SDU is lost. Alternatively, the in-sequence delivery may include sequentially delivering to the higher layer all the RLC SDUs received up to now, when the predetermined timer expires even if the RLC SDU is lost. In addition, the RLC PDUs may also be delivered out of sequence to the PDCP entity after processing the RLC PDUs in the order in which they are received (in the order which they arrive out of serial-number order and out of sequence-number order). In case where segments of the RLC PDU are received, segments stored in a buffer or segments that are later received may be reconstituted into one complete RLC PDU, and then, the complete RLC PDU may be processed and delivered to the PDCP entity. The NR RLC layer may not include a concatenation function. The concatenation function may be performed in a NR MAC layer or may be replaced with multiplexing by the NR MAC layer.

The out-of-sequence delivery by the NR RLC entity refers to delivering out of sequence to a higher layer the RLC SDUs, as is, that are received from a lower layer. The out-of-sequence delivery may include reassembling many received RLC SDUs that result from segmenting a single original RLC SDU, and then delivering the reassembled original RLC SDU. Furthermore, the out-of-sequence delivery may include storing RLC SNs or PDCP SNs of the received RLC PDUs, reordering the received RLC PDUs, and recording the lost RLC PDUs.

The NR MACs 4-15 and 4-30 may establish connections to many NR RLC layer entity constituted in one UE. Primary functions of the NR MAC may include one or several of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS service identification

Transport format selection

Padding

NR PHY layers 4-20 and 4-25 may channel-code and modulate higher layer data for conversion into OFDM symbols and may transfer the resulting OFDM symbols over a radio channel. Alternatively, the NR PHY layers 4-20 and 4-25 may demodulate and channel-decode the received OFDM symbols over a radio channel and may perform an operation of transferring the resulting higher layer data to a higher layer.

Figure 5:
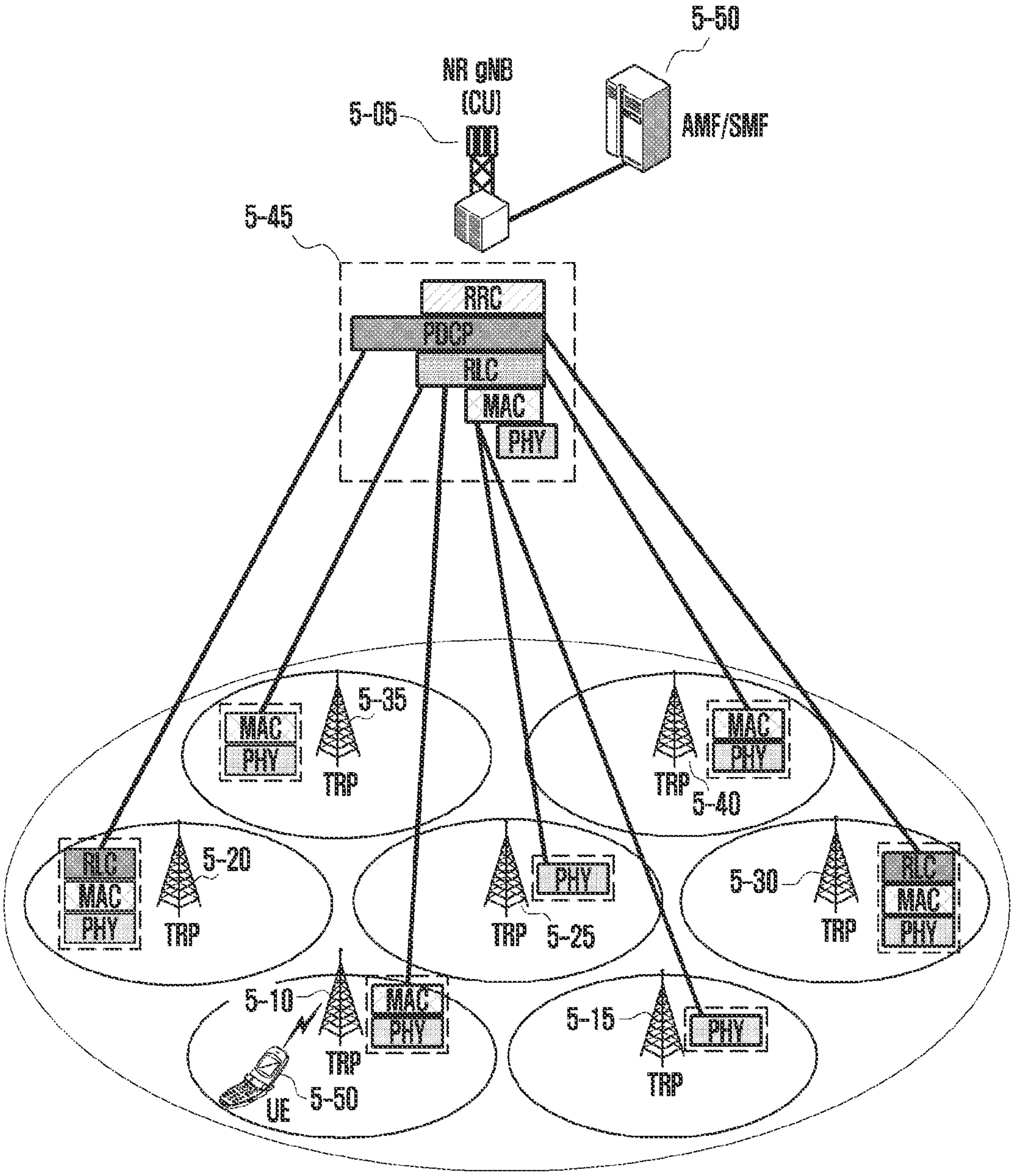
FIG. 5 is a diagram illustrating a structure of another next-generation mobile communication system in which the present disclosure can find application.

FIG. 5 is a diagram illustrating a structure of another next-generation mobile communication system in which the present disclosure can find application.

With reference to FIG. 5, a cell served by a NR gNB 5-05, which operates based on a beam, may be constituted to include many transmission reception points (TRPs) 5-10, 5-15, 5-20, 5-25, 5-30, 5-35, and 5-40. The TRPs 5-10 to 5-40 each represent a block responsible for performing one function of transmitting and receiving a physical signal, which is separated from among functions of the existing NR gNB (eNB), and is constituted to include a multiplicity of antennas.

The NR gNB 5-05 may be expressed as a central unit (CU), and the TRP as a distributed unit (DU). PDCP, RLC, MAC, and PHY layers as in 5-45 may be separated, and thus functions of the NR gNB 5-05 and the TRPs may be configured.

The TRPs 5-15 and 5-25 may each include the PHY layer and a function of the PHY layer. The TRPs 5-10, 5-35, and 5-40 may each include the PHY layer and the MAC layer and may perform respective functions of the PHY layer and the MAC layer. The TRPs 5-20 and 5-30 may each include only the PHY layer, the MAC layer, and the RLC layer and may perform respective functions of the PHY layer, the MAC layer, and the RLC layer.

In addition, the TRPs 5-10 to 5-40 may generate beams in many directions using a multiplicity of transmission and reception antennas, and thus may use the beamforming technology that transmits and receives data. A UE 5-50 establishes connections to the NR gNB 5-05 and an external network through the TRPs 5-10 to 5-40. The NR gNB 5-05 supports a connection of each of the UEs 5-50 to a core network (CN), particularly, to an AMF/SMF 5-50 by collecting and scheduling state information of the UEs 5-50, such as a buffer state, an available transfer power state, and a channel state.

In case where the TRP in the present disclosure includes only the PHY layer and performs the function of the PHY layer, the TRPs 5-10, 5-35, and 5-40 are described as an example. However, embodiments of the present disclosure are not limited thereto. The present disclosure may also apply to a case where the TRP includes the PHY layer and the MAC layer and the respective functions of the PHY layer and the MAC layer and in case where the TRP includes the PHY layer, the MAC layer, and the RLC layer and performs the respective functions of the PHY layer, the MAC layer, and the RLC layer.

In the present disclosure, a method of improving an existing operation is considered in association with a TCI state that is used when indicating a beam that is used during the reception of information transferred over a PDCCH for the UE in the mobile communication system. A method of indicating one downlink beam between one TRP and the UE is considered in the related art. However, a method of indicating a downlink beam for two TRPs may be supported. At this point, indicating a beam between the TRP and the UE means indicating one beam delivered from a specific BWP belonging to one serving cell. In a below-described embodiment of the present disclosure, there is provided a method of simultaneously indicating two (or two or more) pieces of beam information that apply to receive PDCCHs configured in many serving cells and a plurality of BWPs within each of the many serving cells. Thus, a latency time during which a corresponding configuration applies can be reduced, thereby reducing signaling overhead for this configuration.

Figure 6:
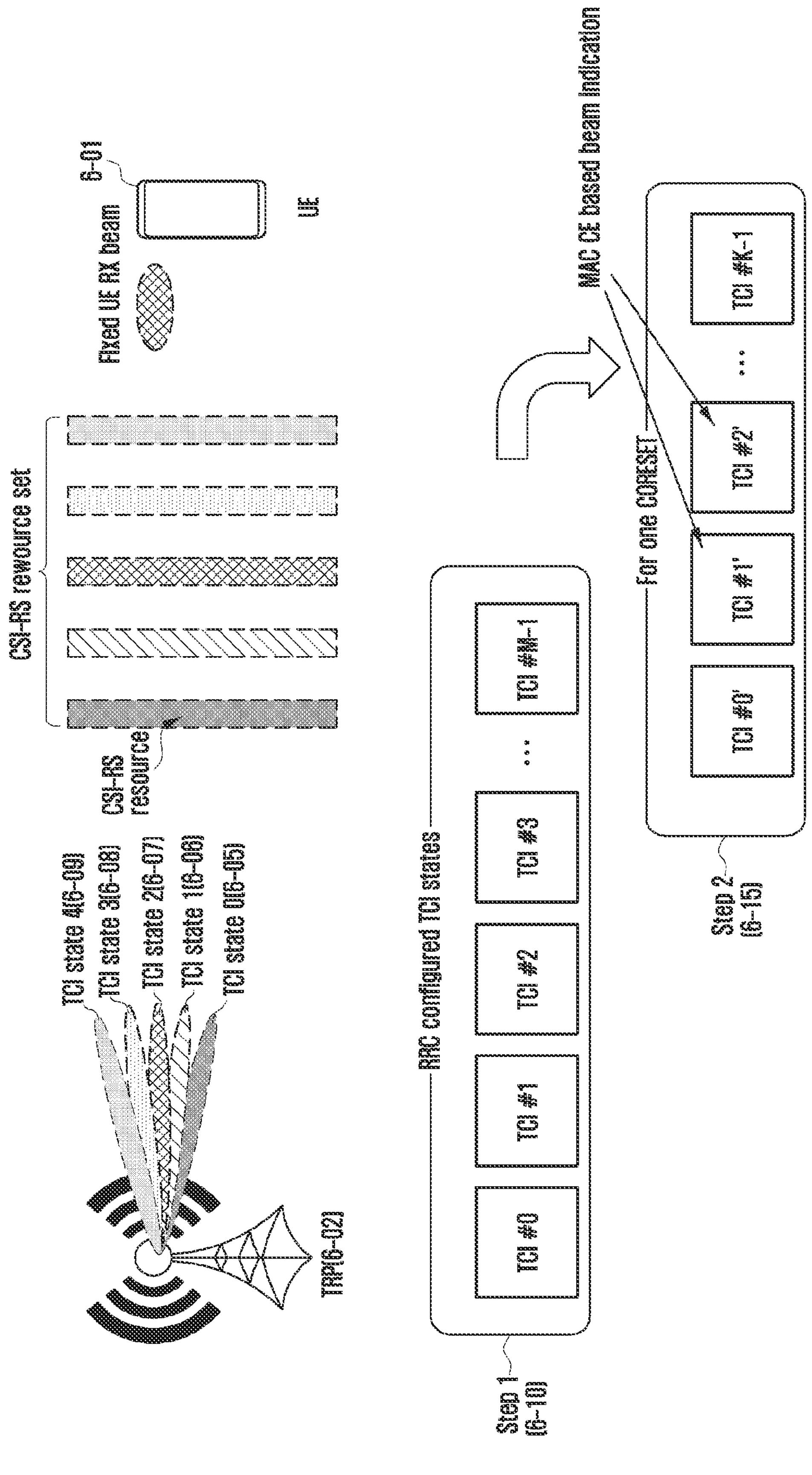
FIG. 6 is a diagram illustrating a method of activating a beam for PDCCH transfer with respect to each of the multi-TRPs configured in a NR system that is referred to in the present disclosure.

FIG. 6 is a diagram illustrating a method of activating a beam for PDCCH transfer with respect to each of the multi-TRPs configured in a NR system that is referred to in the present disclosure.

The NR system is designed in such a manner that a UE 6-01 and a gNB perform data transmission and reception therebetween using a beam having directionality. An advantage of the characteristic data communication through the beam having directionality is that a high data rate support is possible through a broad bandwidth and a rich resource that result from the use of a high frequency. However, a limitation thereof is that a direction is required to be properly set.

In the NR system, in an initial access step, the UE 6-01 may measure a synchronization signal through an SS/PBCH block, and data transmission and reception may be performed toward a beam direction in which the synchronization signal is detected. Subsequently, the gNB may configure up to 64 downlink beams at maximum, which are used for transfer over the PDCCH, through the RRC message, in the UE 6-01. Among these downlink beams, a beam, which is to be actually used, can be indicated through a MAC CE. In addition, the gNB may configure a downlink beam, which is used for transfer over a PDSCH, in the UE 6-01 and may indicate the downlink beam. In case where a specific condition is satisfied, for transfer over the PDSCH, a downlink beam in use for transfer over the PDCCH may be used instead of a downlink beam in use for transfer over the PDSCH. The specific condition refers to a case where a time (a processing time) for switching from the downlink beam for the PDCCH to the downlink beam for the PDSCH is shorter than a required processing time. In the present disclosure, a method of indicating a plurality of downlink beams, each being used for transfer over the PDCCH, through one MAC CE for a plurality of TRPs is considered. Additionally, a method of simultaneously applying this indicating function to a plurality of cells is considered. Particularly, in the present disclosure, a description is provided on the assumption of a situation where a plurality of TRPs are present and where two beams are present. However, it is noted that the content of present disclosure may also apply to a case where a plurality of TRPs are present and where two or more beams are present.

Beams 6-05 to 6-09, over which a CSI RS resource or an SSB resource is delivered, may be configured in the UE 6-01 with respect to the gNB and a TRP 6-02 to which the UE 6-01 establishes connections. It is possible to apply the beam configuration to a beam for transferring the PDCCH. A procedure for configuring a beam is as follows.

Step 6-10 (Step 1): Through the RRC message, the gNB may configure a TCI state on a basis per control resource set (CORESET) contained in PDCCH-Config of a serving cell (in Rel-15/16, it is possible to configure a maximum of 64 beams).

Step 6-15 (Step 2): Through the MAC CE, the gNB may indicate to the UE 6-01 an activation beam for receiving the PDCCH at corresponding CORESET, with respect to a TCI state that is configured through the RRC message and that is used when indicating a beam over which the PDCCH is delivered.

On the other hand, in Rel-15/16, only one TCI state may be indicated in one MAC CE (for example, TCI #2 indication). However, in order to indicate a TCI state for a plurality of TRPs (or a plurality of cells), it is necessary to support a function of allowing indication of two TCI states in one MAC CE (with one signal, a beam for the plurality of TRPs is allowed to be indicated). For example, TCI #1 and TCI #2 may be simultaneously indicated in one MAC CE.

The beam that is configured and indicated in Steps 6-10 and 6-15 may be configured on a per-CORESET basis. That is, all the operations described above apply to one serving cell (or TRP) and one CORESET belonging to the one serving cell. If there is an intent to change beam configurations with respect to a different serving cell and a specific CORESET of the different serving cell, this change is possible by repeatedly operating all the operations described above on a serving cell, a beam configuration for which is intended to be changed. In a normal scenario, the same beam for a plurality of cells may be configured in the UE 6-01. For this reason, in the present disclosure, there is proposed a method of omitting this repetitive operation and simultaneously activating the beam configuration in a plurality of serving cells. This method can not only reduce latency caused by the repetitive operation, but also significantly reduce signaling overhead. Next, with reference to FIG. 7, a function of simultaneously activating a beam with respect to a plurality of cells to support this operation is described. In addition, a method in which this function simultaneously is enabled to support a plurality of beams for the PDCCH is described.

Figure 7:
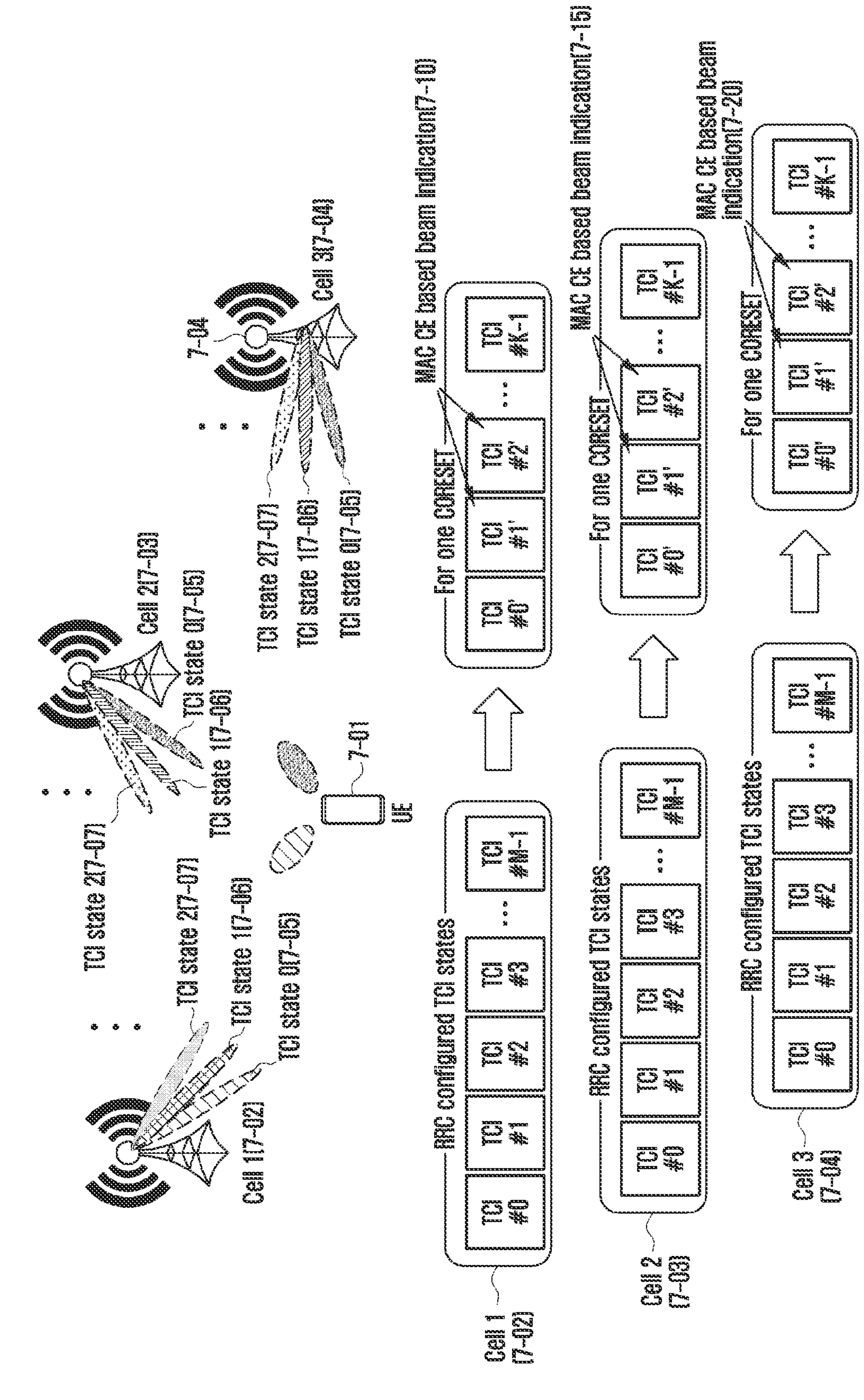
FIG. 7 is a diagram illustrating a method of simultaneously activating a plurality of beams for the PDCCH transfer when a cell is constituted to include the multi-TRPs in a situation where a plurality of serving cells are configured in the NR system in which the present disclosure finds application.

FIG. 7 is a diagram illustrating a method of simultaneously activating a plurality of beams for the PDCCH transfer when a cell is constituted to include the multi-TRPs in a situation where a plurality of serving cells are configured in the NR system in which the present disclosure finds application.

While FIG. 6 illustrates a method of indicating a beam for PDCCH reception in one cell in which one TRP is present, in the present figure, a situation where one cell is constituted to include a plurality of TRPs in a state where a plurality of cells are configured (for example, in the CA) is considered. In addition, this situation refers to a situation where beam activation with respect to the plurality of cells simultaneously applies to another plurality of cells in which the same beams are activated.

Beams 7-05 to 7-07, over which the CSI-RS resource or the SSB resource are delivered, may be configured in a UE 7-01 with respect to Cell 1 (7-02), Cell 2 (7-03), and Cell 3 (7-04) to which the UE 7-01 establishes connections. The beams that are configured and used in Cell 1 (7-02), Cell 2 (7-03), and Cell 3 (7-04) may be the same according to a method of installing and managing the gNB. For the PDCCH transfer, each of the cells may simultaneously use the same beam. That is, in the situation described above, if two TRPs may be configured within one cell and beams for the PDCCH transfer may be configured in a manner that differs on a per-TRP basis, the following procedure may proceed. In order for the following procedure to proceed, TCI state information for the PDCCH reception needs to be delivered on a per-cell basis through the RRC message, and the same TCI state information (ID) needs to be configured consistently between each of the cells. The function of allowing indication of two TCI states in one MAC CE applies to the following procedure (with one signal, a beam for a plurality of TRPs is allowed to be indicated). For example, TCI #1 and TCI #2 may be simultaneously indicated through one MAC CE.

Step 7-10: MAC CE transfer for activation of a plurality of beams for Cell 1 (a multiple TRP situation)

Step 7-15: MAC CE transfer for the activation of the plurality of beams for Cell 2 (a multiple TRP situation)

Step 7-20: MAC CE transfer for the activation of the plurality of beams for Cell 3 (a multiple TRP situation)

However, as known through the procedure described above, in order to execute a procedure for activating a plurality of beams with respect to all cells, each cell needs to sequentially deliver a MAC CE to the UE 7-01. That is, the beam that is configured and indicated in Steps 7-10, 7-15 and 7-20 may be configured on a per-CORESET basis and may apply to one serving cell (or TRP) and one CORESET belonging to the one serving cell. If the beam configurations with respect to a different serving cell and a specific CORESET of the different serving cell are intended to be changed, this change is possible by repeatedly operating all the operations described above on the different serving cell. In a usual scenario, the same beam may be configured in the UE 7-01 with respect to a plurality of cells. Because of this, if this repetitive operation can be omitted and the beam configuration in the plurality of serving cells can be simultaneously activated, this activation can not only reduce the latency time caused by the repetitive operation, but also significantly reduce the signaling overhead. In the following embodiments of the present disclosure, a function of simultaneously activating a beam with respect to a plurality of cells to support this operation is described, and a method in which the function simultaneously supports a plurality of beams for the PDCCH is also described.

Figure 8:
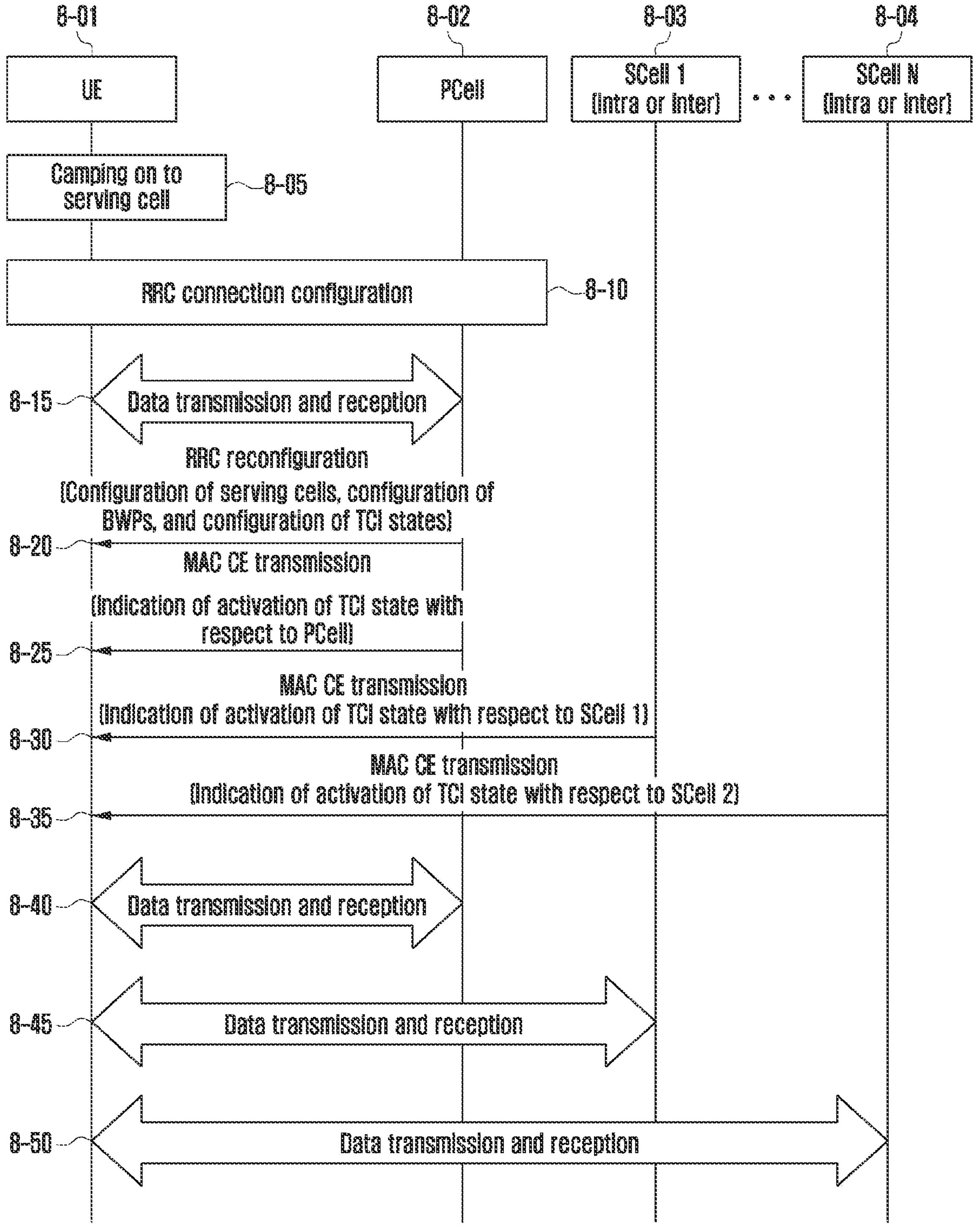
FIG. 8 is a diagram illustrating an entire procedure for configuring a downlink signal, delivered over a PDCCH through the plurality of serving cells, in the plurality of serving cells in the NR system in which the present disclosure finds application.

FIG. 8 is a diagram illustrating an entire procedure for configuring a downlink signal, delivered over the PDCCH through a plurality of serving cells, in the plurality of serving cells in the NR system in which the present disclosure finds application.

In Step 8-05, a UE 8-01 camps on to a serving cell in an RRC IDLE state in Step 8-05. The UE 8-01 executes a procedure for establishing a connection to the serving cell in Step 8-10, and then the serving cell performs data transmission and reception with UE 8-01 in Step 8-15.

Subsequently, beams for the CSI-RS resource and the SSB resource may be configured in the UE 8-01 with respect to the gNB (serving cell) and a plurality of cells 8-02, 8-03, and 8-04 that are configured through an RRC reconfiguration. The beams described above are configured through the RRC on a per-serving cell basis and on a per-CORESET basis. A serving cell that supports a corresponding operation through an RRC configuration, and a specific CORESET are configured. Thereafter, beams for activating all serving cells, which are configured through MAC CEs linked with the serving cells, are determined.

Through PDCCH-Config of each of the plurality of serving cells, which is configured through the RRC in Step 8-20, a TCI state may be configured on a per-CORESET basis in the UE 8-01 (in this configuration, TCI states may be provided in the form of a list, with a maximum of 64 TCI states or even more being configured) That is, a TCI state for the PDCCH with respect to a specific CORESET that is contained in the serving cell 1 is configured, and this TCI state may be present within PDCCH-Config. The TCI state for the PDCCH may also be configured in the same manner on a per-CORESET basis with respect to each of the serving cell 2 and the serving cell 3.

Then, a beam that is used actually in the serving cell and CORESET through the MAC CE in Steps 8-25, 8-30, and 8-35 may be indicated to the UE 8-01.

Through the MAC CE, the gNB may indicate an activation beam to the UE 8-01 with respect to the TCI state that is used when indicating the beam over which the PDCCH is delivered on a per-CORESET basis. The MAC CE contains information indicating one beam, in a beam configuration associated with the TCI state configured through the RRC. The UE 8-01 can receive the PDCCH using this one beam.

The UE 8-01 can receive the PDCCH through the beam that is indicated in Steps 8-40, 8-45, and 8-50 (8-40, 8-45, and 8-50). The UE 8-01 may change a PDCCH reception beam using the beams that are indicated through the MAC CE. The UE 8-01 may receive the PDCCH using the changed PDCCH reception beam.

Figure 9:
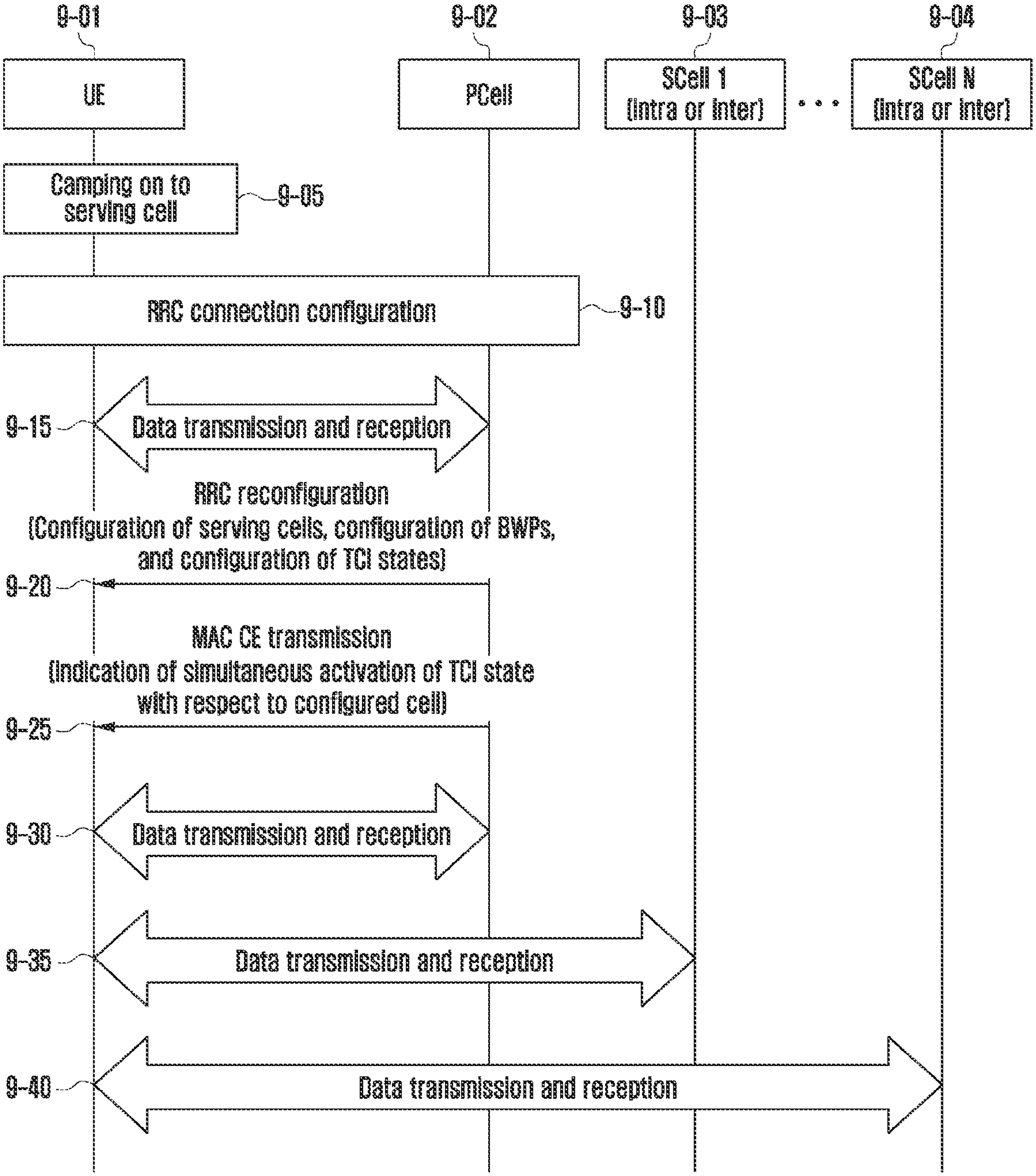
FIG. 9 is a diagram illustrating an entire procedure for simultaneously applying to the plurality of serving cells a beam group for a downlink signal that is delivered over the PDCCH through the plurality of serving cells in the NR system in which the present disclosure finds application.

FIG. 9 is a diagram illustrating an entire procedure for simultaneously applying to the plurality of serving cells a beam group for a downlink signal that is delivered over the PDCCH through the plurality of serving cells in the NR system in which the present disclosure finds application.

As illustrated in FIG. 7, the NR system is designed in such a manner as to perform data transmission and reception between the UE and the gNB using a beam having directionality. In a CA scenario in which a plurality of serving cells are configured, a plurality of pieces of beam information that apply to the PDCCH reception configured in many serving cells can be simultaneously indicated. Accordingly, in the present disclosure, an operation of reducing the latency time during which a corresponding configuration applies and reducing the signaling overhead for this configuration is proposed.

A UE 9-01 camps on to a serving cell in an RRC IDLE state in Step 9-05. The UE 9-01 executes a procedure for establishing a connection to the serving cell in Step 9-10, and then the serving cell performs data transmission and reception with the UE 9-01 in Step 9-15. Subsequently, the beams for the CSI-RS resource and the SSB resource may be configured in the UE 9-01 with respect to the NE gNB (serving cell) and a plurality of cells 9-02, 9-03, and 9-04 that are configured through the RRC reconfiguration. The beams described above are configured through the RRC on a per-serving cell basis and on a per-CORESET basis. A serving cell that supports a corresponding operation through an RRC configuration, and a specific CORESET are configured. Thereafter, beams for activating all serving cells, which are configured through MAC CEs linked with the serving cells, are determined.

For a method of simultaneously activating a plurality of beams for the PDCCH with respect to a plurality of cells, which is proposed in the present disclosure, it is necessary to configure a serving cell in which a corresponding operation is performed. The serving cell that supports the corresponding operation through the RRC configuration is indicated. Thereafter, activation beam information of all the serving cells that is configured through one MAC CE is updated. More specific operations are described below in a stepwise manner.

Through PDCCH-Config of each of the plurality of serving cells, which is configured through the RRC in Step 9-20, a TCI state may be configured on a per-CORESET basis in the UE 9-01 (in this configuration, TCI states may be provided in the form of a list, with a maximum of 64 TCI states or even more being configured) That is, a TCI state with respect to a specific CORESET for the PDCCH that is contained in the serving cell 1 is configured, and this TCI state may be present within PDCCH-Config. The TCI state for the PDCCH may also be configured in the same manner on a per-CORESET basis with respect to each of the serving cell 2 and the serving cell 3.

In addition, information (an indicator or a cell list) indicating application of the same beam configuration may be added to the serving cell to which the same beam configuration applies and to CORESET. Alternatively, information indicating application of a common configuration through the RRC configuration may be omitted, and the omission can be indicated in the subsequent MAC CE.

Then, in Step 9-25, through the MAC CE, the UE 9-01 may receive information on a beam that is actually simultaneously used in a plurality of serving cells and CORESET.

The gNB may indicate to the UE 9-01 the activation beam through the MAC CE with respect to the TCI state that is used when indicating the beam over which the PDCCH is delivered on a per-CORSET basis. The MAC CE may contain information indicating one or two beams, in the beam configuration associated with the TCI state configured through the RRC. The UE 9-01 may receive the PDCCH by applying the one or two beams to the plurality of serving cells. For reference, information on the serving cell to which the one or two beams apply is configured as a cell list or an indicator through the RRC configuration, or may be directly indicated in a step in which the gNB transfers the MAC CE.

Then, the UE 9-01 may receive the PDCCH through the beam indicated in Steps 8-30, 8-35, and 8-40. The UE 9-01 may change the PDCCH reception beam using the beams that are indicated through the MAC CE. The UE 9-01 may apply the changed PDCCH reception beam to all serving cells that are configured.

In the embodiments described below, a specific method of enabling simultaneous indication of a plurality of beams with respect to a plurality of carriers is proposed as the above-described method of indicating the TCI state for the PDCCH reception, that is, indicating the beam configuration and activation.

Embodiment 1 proposes, as a MAC CE-based solution, a method in which one MAC CE contains serving cell information for applying a plurality of TCI states in a shared manner for the PDCCH reception.

In addition, Embodiments 2, 3, and 4 propose, as an RRC-based solution, a method in which serving cell information for applying the plurality of TCI states for the PDCCH reception in a shared manner is provided in advance through the RRC configuration, and in which, when activation of the plurality of TCI states for the PDCCH reception is indicated through one MAC CE, a corresponding beam applies to all cells in a cell list in which a corresponding serving cell is contained. In addition, this method supports indication of a beam with respect to an existing individual serving cell, as well as simultaneous indication of a plurality of beams with respect to a plurality of carriers, thereby providing the advantage of reducing both the signaling overhead and the latency time and the feature of supporting an efficient beam update operation. Overall operations are as illustrated in FIG. 9, and specific operations will be described below in the embodiments.

FIGS. 10A, 10B, 10C, and 10D are diagrams, each illustrating a MAC CE structure proposed in the present disclosure. The MAC CE structure may apply to all the embodiments and supports an operation of simultaneously updating the plurality of TCI states for the PDCCH reception with respect to the plurality of carriers. In the present disclosure, a description is provided with the number of the plurality of TCI states being limited to 2. However, the number of TCI states may increase to 2 or more.

Based on "TCI State Indication for UE-specific PDCCH MAC CE" defined in Rel-15, a change to a new MAC CE may occur, or a new field may be added. An existing MAC CE structure is constituted to contain a serving cell ID, a CORESET ID, and a TCI state ID. The TCI state ID is used to indicate beam information necessary to receive the PDCCH. Through the existing MAC CE, a downlink activation beam for one serving cell may be indicated. In Rel-16, in case where a cell group is indicated through the RRC configuration, the indicated beam may simultaneously apply to many serving cells.

The MAC CE structure in use may vary according to a first method (mapping of corresponding carrier information to the MAC CE) and a second method (mapping of corresponding carrier information to the RRC configuration), which are proposed in the present disclosure. In the first method and the second method, in order to support multi-TRPs, activation of a plurality of TCI states, which are used for the PDCCH transfer to a plurality of TRPs within one cell, is supported, and, as the same time, TCI states in all carriers, which are simultaneously indicated/configured through a plurality of corresponding TCI state activation MAC CEs, are updated.

First, according to the first method, in the RRC configuration, a cell list for simultaneously beam-updating a plurality of carriers and the CORESET using only the MAC CE may be provided and indicated without providing information (list) on a carrier to which simultaneous activation of a plurality of beams applies. The MAC CE structure that applies to the first method will be described below. (Embodiment 1)

Option 1-a: Providing the TCI State ID in a Bitmap Manner

According to Option 1-a, the MAC CE may be used as a new LCID by adopting a new LCID. In this case, the MAC CE structure may be constituted to contain a serving cell ID 10-05 and a CORESET ID 10-10 to which the MAC CE applies, and a plurality of TCI state IDs 10-15 and 10-20 may be used, with activation of each being indicated. An A field 10-25 is a field indicating whether or not additional serving cell information is present (or contained) in succession to the TCI state ID field when the MAC CE is simultaneously applicable to a plurality of carriers. In addition, a “T” field 10-30 is constituted to contain other carrier information representing the application of the TCI state whose activation is indicated.

That is, in case where a plurality of TCI states are used with respect to only one serving cell, an A field 10-25 is set to 0, and an octet containing a subsequent T field 10-30 may be omitted, be set to 0, or be ignored. Conversely, in case where the MAC CE simultaneously applies to a plurality of serving cells, the A field 10-25 is set to 1, and the MAC CE containing a T field 10-30 may be delivered to the UE. The plurality of TCI state IDs may be pieces of TCI state information that correspond to TRP 1 and TRP 2, respectively. Because the T field 10-30 may overlap a field for the serving cell ID 10-05, the field for the serving cell ID 10-05 may also be omitted. In addition, the field arrangement and sizes in the MAC CE having the present constitution may be changed.

The UE may recognize that, through an LCID of the received MAC CE, the MAC CE is a MAC CE for indicating a plurality of beams. With reference to information delivered through the MAC CE, the UE may receive the PDCCH with respect to one serving cell or another serving cell using a beam that corresponds to the indicated TCI state.

Option 1-b: Directly Providing the TCI State ID

According to Option 1-b, the MAC CE may be used as a new MAC CE by adopting a new LCID. In this case, the MAC CE structure may be constituted to contain a serving cell ID 10-35 and a CORESET ID 10-40 to which the MAC CE applies, and a plurality of TCI state IDs 10-45 and 10-50 may be used, with activation of each being indicated. An A field 10-55 is a field indicating whether or not additional serving cell information is present (or contained) in succession to the TCI state ID field when the MAC CE is simultaneously applicable to a plurality of carriers. In addition, M serving cell IDs, for example, serving cell IDs 10-65~10-70, which are other pieces of carrier information that represent the application of the TCI state whose activation is indicated, may be contained. Additionally, a plurality of reserved bits (Rs) 10-60 may be present.

That is, in case where a plurality of TCI states are used with respect to only one serving cell, an A field 10-55 is set to 0, and an octet containing serving cell IDs 10-65~10-70 is omitted. Conversely, in case where the MAC CE needs to simultaneously apply to a plurality of serving cells, the A field 10-55 is set to 1, and the MAC CE containing fields for additional serving cell IDs 10-65~10-70 may be delivered to the UE. The plurality of TCI state IDs may be pieces of TCI state information that correspond to TRP 1 and TRP 2, respectively. In addition, the field arrangement and sizes in the MAC CE having the present constitution may be changed. In this case, the meanings of A field values of 0 and 1 may be reversed.

The UE may recognize that, through the LCID of the received MAC CE, the MAC CE is the MAC CE for indicating a plurality of beams. With reference to information delivered through the MAC CE, the UE may check whether the indicated TCI state indicates a beam with respect to one serving cell or a beam with respect to a different serving cell and may use this beam.

In addition, one example where two TCI state IDs are configured in Option 1-a and Option 1-b of the first method is described. However, a method of configuring two or more TCI state IDs may also be considered in the present disclosure. In this case, the LCID may be configured in such a manner as to indicate the MAC CE for indicating a plurality of beams. In addition, one bit of information (hereinafter referred to as a C bit) is contained in the MAC CE and, subsequently, may indicate whether or not the TCI state ID is present. That is, the C bit is contained behind the CORSET ID, and may indicate whether or not a TCI state 1 (10-15) is present. Furthermore, the C bit is contained behind TCI state ID 1 (10-15) and, subsequently, may indicate whether TCI state ID 2 is contained in the MAC CE. In this manner, one TCI state ID or a plurality of TCI state IDs may be contained in the MAC CE. In this case, a position of the A field may be changed. The A field may be positioned after the last field for the TCI state ID and after a one-bit field indicating the absence of a TCI state ID that follows.

Alternately, instead of using a separate indicator as described above, the UE may check how many TCI state IDs are contained, using the size of the indicated MAC CE.

In addition, according to the second method, the gNB may provide the UE with a cell list for simultaneously activating a plurality of beams for the PDCCH reception for the plurality of carriers, through the RRC configuration, and may activate a beam for the cell through the MAC CE. The MAC CE structure that applies to the second method will be described below. (Embodiment 2, Embodiment 3, and Embodiment 4)

Option 2-1: Serving cell group lists (simultaneousTCI-UpdateList1 and simultaneousTCI-UpdateList2) are used for simultaneous application of activation of one PDCCH/PDSCH TCI state that is previously defined. These serving cell group lists may also be used as is, in case where activation of a plurality of (two) TCI states simultaneously applies. Furthermore, the plurality of (two) TCI states may be indicated by adopting a new MAC CE structure. Therefore, in case where a serving cell ID of the MAC CE is contained in the serving cell group list configured in the RRC, the UE activates both of the two TCI states that are indicated in the MAC CE with respect to cells that belong to the same group as the serving cell.

The MAC CE may be used as a new MAC CE by adopting a new LCID. In this case, the MAC CE structure may be constituted to contain a serving cell ID 10-70 and a CORESET ID 10-75 to which the MAC CE applies, and a plurality of TCI state IDs 10-80 and 10-85 may be used, with activation of each being indicated. Additionally, a reserved bit (R) 10-90 may be present.

The feature of the option is that a cell list for simultaneously applying one TCI state to a plurality of carriers is the same as a cell list for simultaneously applying two TCI states to the plurality of carriers. Thus, the feature poses a limitation in that a TCI update operation between an existing MAC CE and a new MAC CE is required to be supported in a compatible manner. The existing cell list (adopted in Rel-16) is configured regardless of simultaneous updating of two TCI states in a plurality of component carriers (CCs). Therefore, in order to apply a new function to cells in the same list, through the UE capability, it is necessary to check the UE capability for the applicability thereof to the same cell list. The configuration of the gNB is also required to be in accord therewith. That is, two functions cannot be controlled independently of each other and can be integrally managed.

Option 2-2: Serving cell group lists (simultaneousTCI-UpdateList1 and simultaneousTCI-UpdateList2) are used for simultaneous application of activation of one PDCCH/PDSCH TCI state that is previously defined. These serving cell group lists may also be used as is, in case where activation of a plurality of (two) TCI states simultaneously applies. Furthermore, a new MAC CE structure may be adopted, and the plurality of (two) TCI states may be indicated. Therefore, in case where a serving cell ID of the MAC CE is contained in the serving cell group list configured in the RRC, the UE activates both of the two TCI states that are indicated in the MAC CE with respect to cells that belong to the same group as the serving cell. A field for turning on and off a function of applying a plurality of beams for a new PDCCH, additionally adopted, to a plurality of cells is added to the MAC CE. Consequently, this function can be controlled independently of an existing operation.

The MAC CE may be used as a new MAC CE by adopting a new LCID. In this case, the MAC CE structure is constituted to contain a serving cell ID 10-95 and a CORESET ID 10-100 to which the MAC CE applies, and a plurality of TCI state IDs 10-105 and 10-110 may be used, with activation of each being indicated. An S field 10-115 may be additionally present. The S field is an indicator indicating whether the received MAC CE is applicable to only one indicated serving cell/CORESET (for example, in case where the S field is set to 0) or applicable to all cells in the serving cell lists (simultaneousTCI-UpdateList1 and simultaneousTCI-UpdateList2) that is preconfigured with the RRC (for example, in case where the S field is set to 1). In the present example, the meanings of S field values of 0 and 1 may be reversed.

Option 2-3: Cell lists (for example, simultaneousTCI-UpdateList3 and simultaneousTCI-UpdateList4) are newly adopted. These cell lists are used for simultaneously applying activation of a plurality of (two) TCI states, separately from the serving cell group lists (simultaneousTCI-UpdateList1 and simultaneousTCI-UpdateList2) that are used for simultaneously applying application of one PDCCH/PDSCH TCI state that is previously defined. The plurality of (two) TCI states may be indicated by adopting a new MAC CE structure. In a case where a serving cell ID of the MAC CE is contained in the new serving cell group lists (simultaneousTCI-UpdateList3 and simultaneousTCI-UpdateList4) that are configured in the RRC, the UE activates both of the two TCI states that are indicated in the MAC CE with respect to cells that belong to the same group as the serving cell.

The MAC CE may be used as a new MAC CE by adopting a new LCID. In this case, the MAC CE structure may be constituted to contain a serving cell ID 10-120 and a CORESET ID 10-125 to which the MAC CE applies, and a plurality of TCI state IDs 10-130 and 10-135 may be used, with activation of each being indicated. Additionally, a reserved bit (R) 10-140 may be present.

A characteristic difference between Option 1 and each of Option 2-1, Option 2-2, and Option 2-3 is that information (list) on a carrier to which simultaneous beam activation applies is received through pre-configuration of the RRC, without being provided in the MAC CE.

In addition, one example in which two TCI state IDs are configured in Option 2-1, Option 2-2, and Option 2-3 of the second method is described. However, in the present disclosure, a method of configuring two or more TCI state IDs may also be considered. The method of configuring two or more TCI state IDs is the same as described above, and a specific description thereof is not provided below.

Figure 10A:
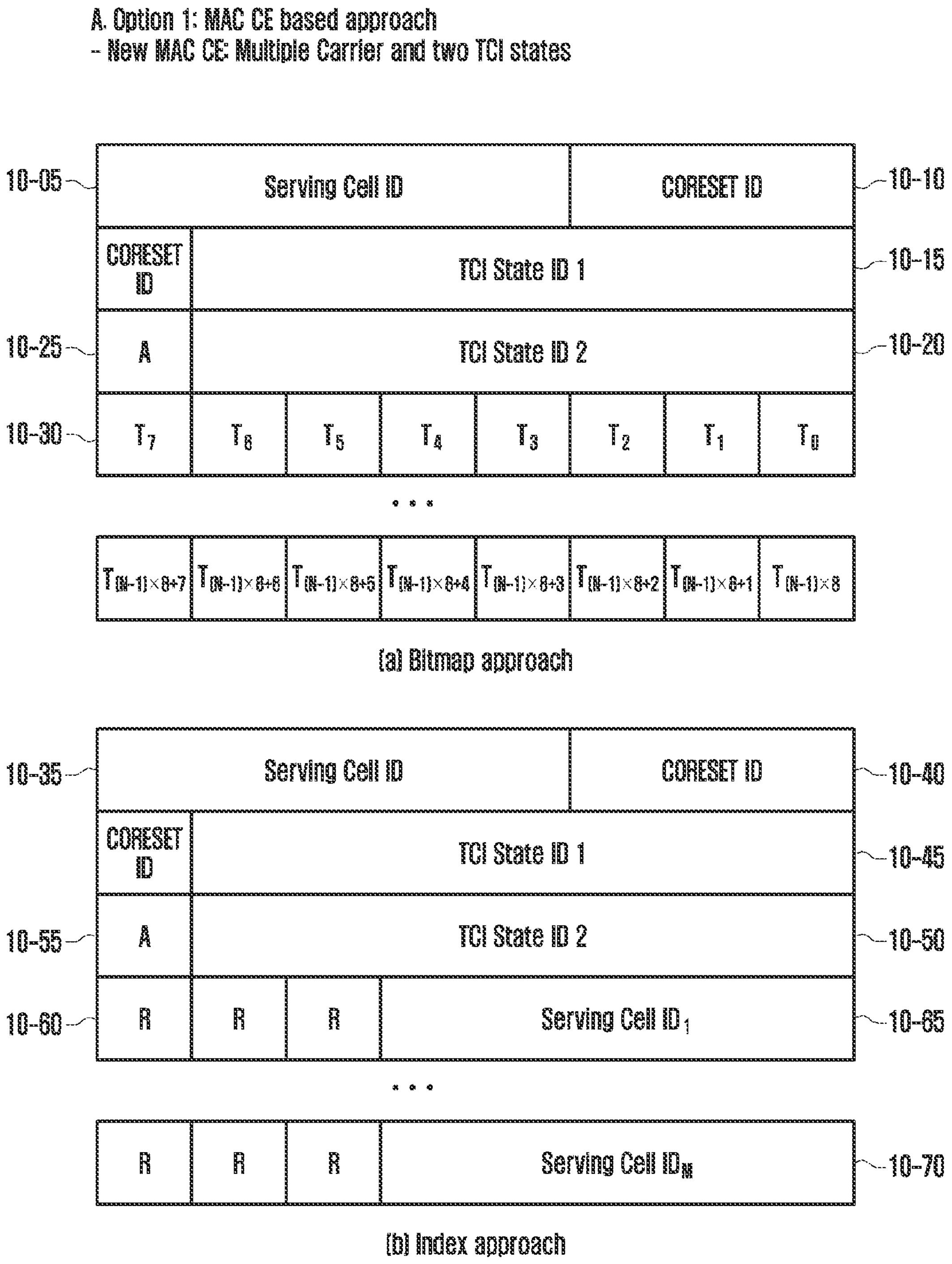
FIGS. 10A, 10B, 10C, and 10D are diagrams, each illustrating a MAC CE structure proposed in the present disclosure.
Figure 10B:
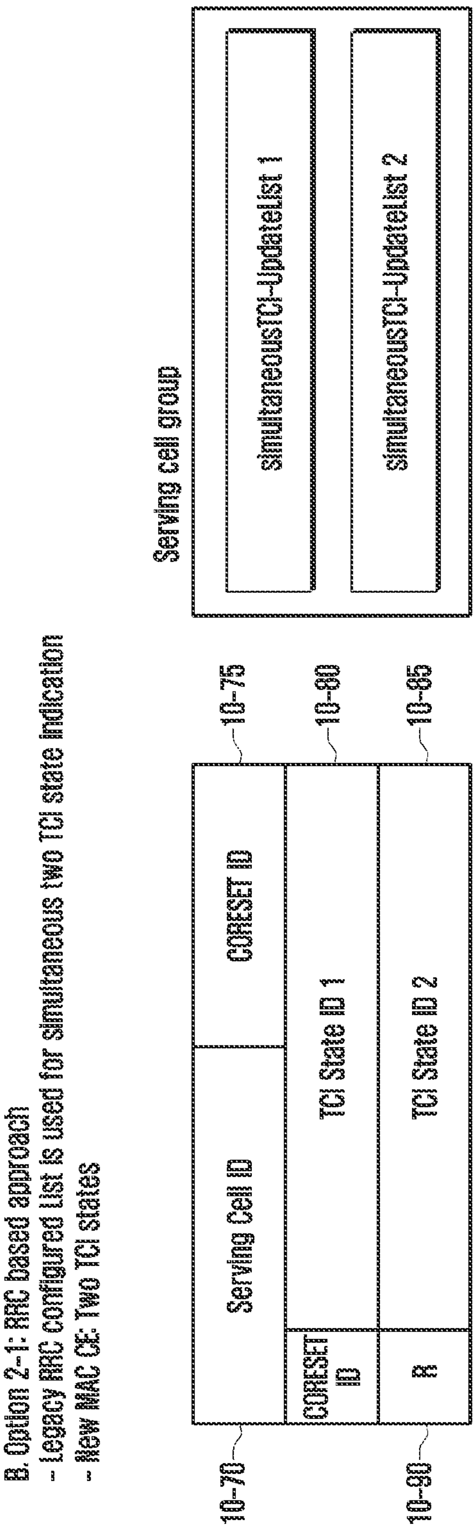
Figure 10C:
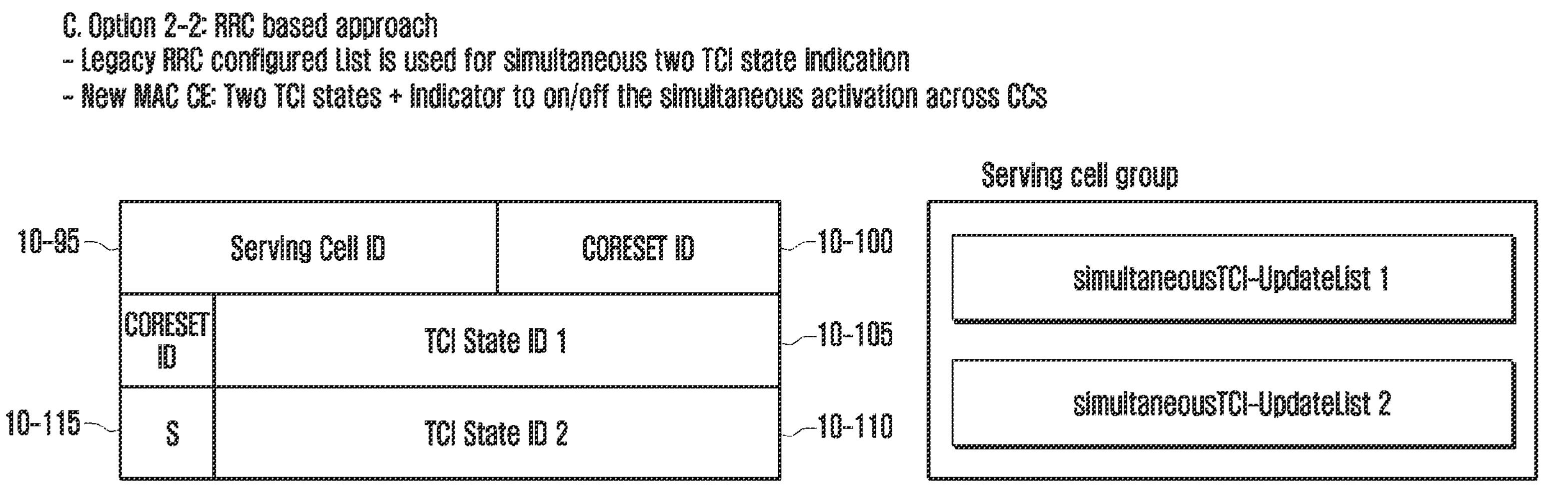
Figure 10D:
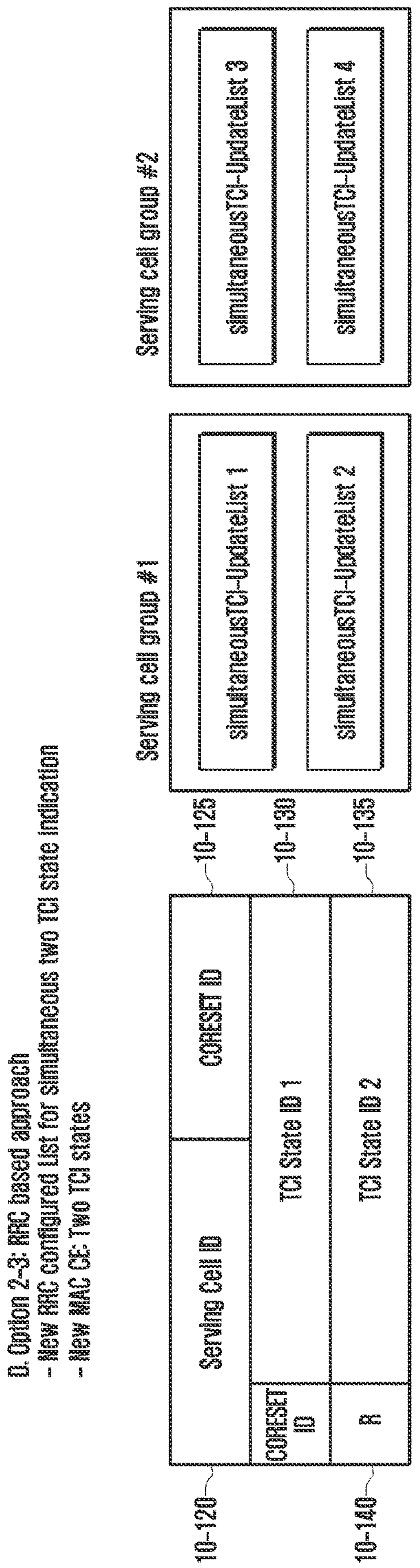
Figure 11:
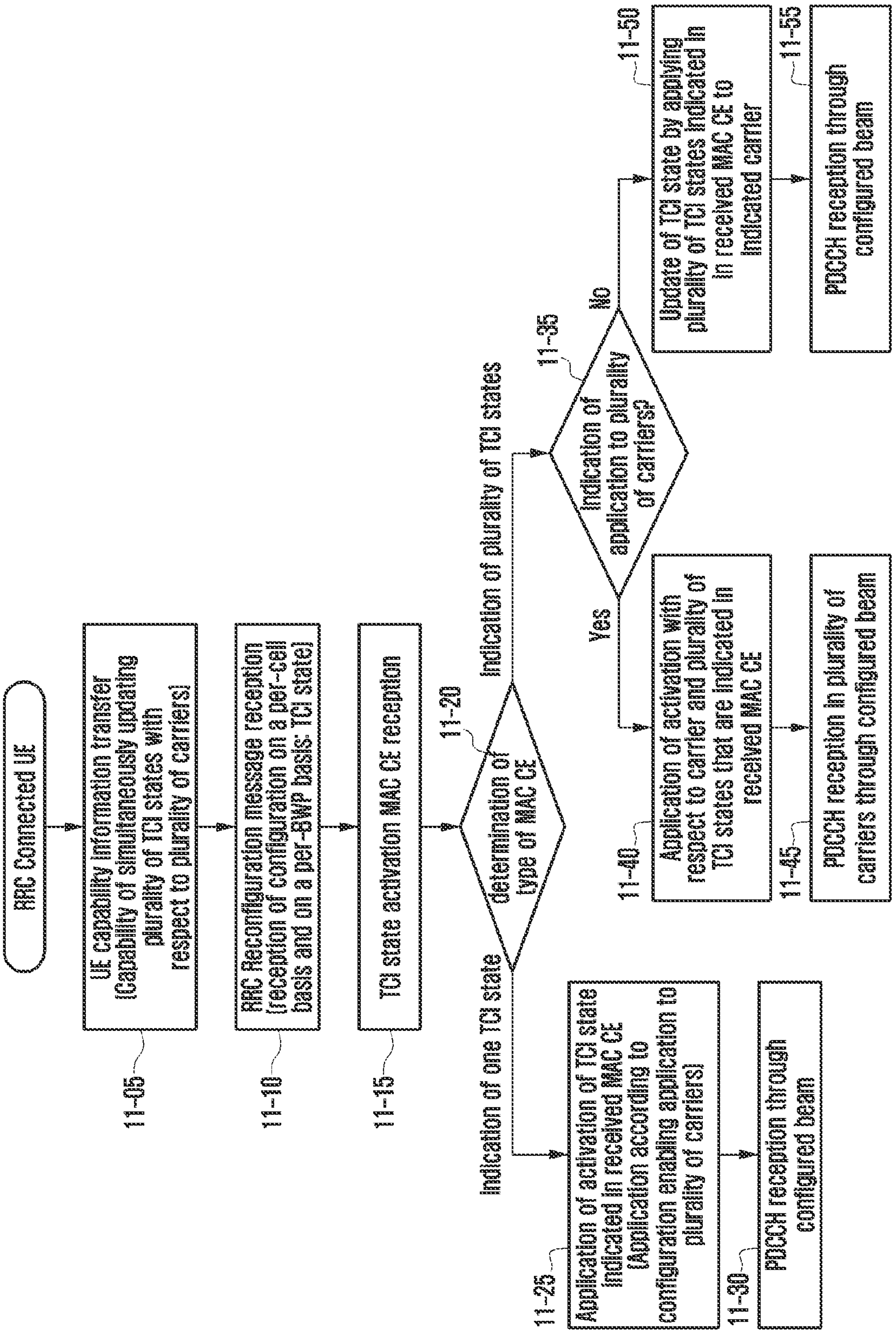
FIG. 11 is a flowchart illustrating, as Embodiment 1 proposed in the present disclosure, a first method (which specifies corresponding carrier information in a MAC CE) of activating TCI states in all carriers indicated in the MAC CE through a TCI state activation MAC CE (which indicates activation of two TCI states) newly adopted, with respect to a plurality of carriers in a situation where CA applied.

FIG. 11 is a flowchart illustrating, as Embodiment 1 proposed in the present disclosure, the first method (which specifies corresponding carrier information in a MAC CE) of activating TCI states in all carriers indicated in the MAC CE through a TCI state activation MAC CE (which indicates activation of two TCI states) newly adopted, with respect to a plurality of carriers in a situation where CA applied. FIG. 10A is referred to for a detailed MAC CE structure and a detailed operation of the MAC CE.

In Step 11-05, in response to a UE capability request message from the gNB, the UE, which is in a state of establishing an RRC connection, generates and stores UE capability information and delivers the UE capability information to the gNB. Particularly, the UE capability information may contain an indicator indicating whether or not simultaneous activation of two beams with respect to a plurality of carriers is supported. The following two methods are possible as methods for this indication.

First Method of Delivering the UE Capability

By adopting a one-bit indicator, it can be indicated whether or not the UE supports simultaneous activation of two beams with respect to a plurality of carriers. If it is indicated that the UE supports the UE capability, the UE capability may apply to all band combinations (containing both an intra-band BC and an inter-band BC) contained in the UE capability information (with one-bit indicator per UE, UE supports this feature for all supported BCs which UE reports to the gNB).

Second Method of Delivering the UE Capability

An indicator indicating whether or not simultaneous activation of two beams with respect to a plurality of carriers is supported on a basis per band combination supported by the UE may be contained in the UE capability information (one-bit indicator per BC i.e. this feature can be supported for the among the CCs in the supported BC including intra-band and inter-band BC).

In Step 11-10, the gNB delivers configuration information (ServingCellConfig) for configuring a plurality of serving cells and TRPs to the UE through the RRC message. The RRC message may contain configuration information (PDCCH-Config and PDSCH-Config) for receiving over a PDCCH and a PDSCH. Particularly, the RRC message contains a BWP configuration (BWP-Uplink and BWP-Downlink), a CORESET configuration, a scrambling configuration, a TCI state (TCI-State in PDCCH-Config and PDSCH-Config) configuration, and the like. Particularly, a configuration associated with the TCI state is provided on a per-serving cell and on a per-downlink BWP basis, and is contained in each of PDCCH-Config and PDSCH-Config. A beam configuration for PUCCH resource transfer is also contained in PUCCH-config. The RRC configuration may also contain an indicator indicating whether or not a configuration is performed with respect to a plurality of carriers. By configuring a one-bit indicator, it can be recognized whether or not the configuration is performed with respect to the plurality of carriers.

In Step 11-15, the UE may receive a MAC CE indicating activation of the TCI state for the PDCCH reception from the gNB. As illustrated in FIG. 9 and FIGS. 10A to 10D, the UE may activate a plurality of beams indicated through the MAC CE and thus may use the plurality of beams for the PDCCH reception. The UE may receive data using the plurality of beams. The feature of Embodiment 1 is that an existing configuration is used as is, without an additional RRC configuration and that the beam activation with respect to a plurality of serving cells is indicated based on the new MAC CE described above. That is, Embodiment 1 features a method in which activation of two beams, reflecting multi-TRPs, applies to identifiers of all serving cells, and in which these identifiers are specified within one new MAC CE. In Step 11-15, the UE may receive a MAC CE indicating activation of one beam previously defined and may also receive a MAC CE indicating activation of a plurality of beams newly defined. The two MAC CEs may be enabled to simultaneously apply to one serving cell or a plurality of serving cells according to a configuration. A specific MAC CE structure is the same as described with reference to FIG. 10A, and thus the same description thereof is not provided below.

In Step 11-20, the UE may check the MAC CE received in Step 11-15 and may perform an operation associated with this checking. In case where the received MAC CE indicates activation of one TCI state for the PDCCH reception (a determination is made through an existing MAC CE and LCID), in Step 11-25, the UE may apply a TCI state indicated in the MAC CE to a carrier indicated in the MAC CE and to the CORESET. In case where a serving cell indicated in the MAC CE is contained in a serving cell group list for simultaneous activation, the UE may activate a TCI state with respect to all serving cells in the serving cell group list. In Step 11-25, a serving cell and BWP to which the MAC CE is delivered may be one serving cell and BWP that is activated and, as an example, may be represented by a downlink active BWP ID of a Pcell. In Step 11-30, the UE may receive the PDCCH through a configured beam. In addition, in case where the UE again receives the TCI state activation MAC CE, the UE repeats Step 11-20.

In case where in Step 11-20, the MAC CE received by the UE indicates activation of two TCI states for the PDCCH reception (a determination is made through a new MAC CE and LCID), in Step 11-35, the UE may determine, through MAC CE, whether the MAC CE is applicable to only one serving cell or to a plurality of carriers.

The UE may know the size of the MAC CE through a header of a MAC PDU in which the MAC CE is contained. Alternatively, through fields (A fields: 10-25 and 10-55) indicating simultaneous activation by decoding the MAC CE, the UE may determine whether or not information on an additional serving cell is contained (alternatively, through the A fields contained in the MAC CE, the UE may determine whether or not the MAC CE is applicable to a plurality of carriers). In case where the simultaneous activation with respect to a plurality of carriers is indicated, in Step 11-40, all serving cell indicated in the MAC CE may be activated through the indicated TCI state by applying the two TCI states indicated in the MAC CE. In Step 11-45, the UE may receive the PDCCH through the configured beam. In addition, in case where the UE again receives the TCI state activation MAC CE, the UE repeats Step 11-20.

In case where in Step 11-35, the simultaneous activation with respect to the plurality of carriers is not indicated, in Step 11-50, the UE applies the plurality of TCI states, indicated in the received MAC CE, to only the indicated serving cell, and in Step 11-55, the UE may receive the PDCCH through the configured beam. In addition, in case where the UE again receives the TCI state activation MAC CE, the UE repeats Step 11-20.

Figure 12:
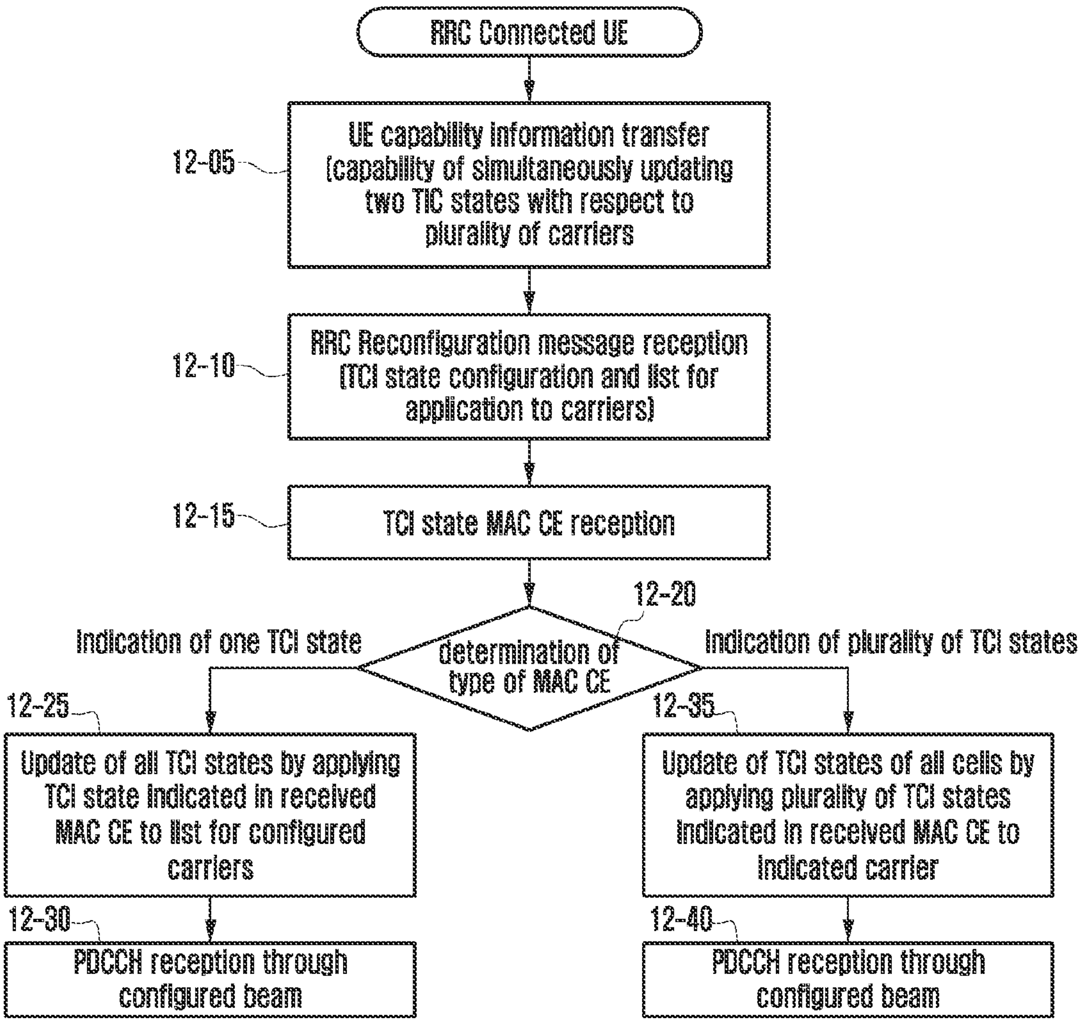
FIG. 12 is a flowchart illustrating, as Embodiment 2 proposed in the present disclosure, a (2-1)-nd method (which maps corresponding carrier information to an RRC configuration) of activating TCI states in all carriers simultaneously configured through two TCI state activation MAC CEs, with respect to the plurality of carriers in the situation where the CA applies.

FIG. 12 is a flowchart illustrating, as Embodiment 2 proposed in the present disclosure, a (2-1)-nd method (which maps corresponding carrier information to an RRC configuration) of activating TCI states in all carriers simultaneously configured through two TCI state activation MAC CEs, with respect to the plurality of carriers in the situation where the CA applies.

In Step 12-05, in response to a UE capability request message from the gNB, the UE, which is in a state of establishing an RRC connection, generates and stores UE capability information and delivers the UE capability information to the gNB. Particularly, the UE capability information may contain an indicator indicating whether or not simultaneous activation of two beams with respect to a plurality of carriers is supported. The following two methods are possible as methods for this indication.

First Method of Delivering the UE Capability

By adopting a one-bit indicator, it can be indicated whether or not the UE supports simultaneous activation of two beams with respect to a plurality of carriers. If it is indicated that the UE supports the UE capability, the UE capability may apply to all band combinations (containing both an intra-band BC and an inter-band BC) contained in the UE capability information (with one-bit indicator per UE, UE supports this feature for all supported BCs which UE reports to the gNB).

Second Method of Delivering the UE Capability

An indicator indicating whether or not simultaneous activation of two beams with respect to a plurality of carriers is supported on a basis per band combination supported by the UE may be contained in the UE capability information (one-bit indicator per BC i.e. this feature can be supported for the among the CCs in the supported BC including intra-band and inter-band BC).

In Step 12-10, the gNB delivers configuration information (ServingCellConfig) for configuring a plurality of serving cells and TRPs to the UE through the RRC message. The RRC message may contain configuration information (PDCCH-Config and PDSCH-Config) for receiving over a PDCCH and a PDSCH. Particularly, the RRC message contains a BWP configuration (BWP-Uplink and BWP-Downlink), a CORESET configuration, a scrambling configuration, a TCI state (TCI-State in PDCCH-Config and PDSCH-Config) configuration, and the like. Particularly, a configuration associated with the TCI state is provided on a per-serving cell basis and on a per-downlink BWP basis, and each of the configurations associated with the TCI state is contained in PDCCH-Config and PDSCH-Config. A beam configuration for PUCCH resource transfer is also contained in PUCCH-config.

The feature of Embodiment 2 is that in Step 12-10, the cell list, to which simultaneous activation of two beams with respect to the plurality of carriers applies, is used in a manner that shares existing cell lists (simultaneousTCI-UpdateList1 and simultaneousTCI-UpdateList2) that are provided through the RRC message. That is, a TCI state that applies to the serving cell is configured in PDCCH-Config in which a TCI state is configured, and the serving cell lists (simultaneousTCI-UpdateList1 and simultaneousTCI-UpdateList2), to which the same configuration applies, are contained in CellGroupConfig and thus may apply for simultaneous activation of two beams with respect to the plurality of carriers. In Step 12-15, the UE may receive a MAC CE, indicating activation of the TCI state for the PDCCH reception, from the gNB. As illustrated in FIG. 9 and FIGS. 10A to 10D, the MAC CE may activate a plurality of beams actually indicated. Thus, the MAC CE may use the plurality of beams for the PDCCH reception and may receive data based thereon. The feature of Embodiment 2 is that a cell list for simultaneous beam activation with respect to a plurality of cells, which is provided in an existing RRC configuration, is used as is, and that activation of a plurality of beams with respect to a plurality of serving cells is indicated based on the new MAC CE described above. In Step 12-15, the UE may receive a MAC CE indicating activation of one beam previously defined or may also receive a MAC CE indicating activation of a plurality of beams newly defined. The two MAC CEs may be enabled to simultaneously apply to one serving cell or a plurality of serving cells according to a configuration. A specific MAC CE structure is the same as described with reference to FIG. 10B, and thus the same description thereof is not provided below.

The UE in Step 12-20 may check the MAC CE received in Step 12-15 and may perform an operation associated with this checking. In case where the received MAC CE indicates activation of one TCI state for the PDCCH reception (a determination is made through an existing MAC CE and LCID), in Step 12-25, the UE may apply a TCI state indicated in the MAC CE to a carrier indicated in the MAC CE and to the CORESET. In case where a serving cell indicated in the MAC CE is contained in a serving cell group list for simultaneous activation, the UE may activate a TCI state with respect to all serving cells in the serving cell group list. In Step 12-25, a serving cell and BWP to which the MAC CE is delivered may be one serving cell and BWP that is activated and, as an example, may be a downlink active BWP ID of a PCell. In Step 12-30, the UE may receive the PDCCH through a configured beam. In addition, in case where the UE again receives the TCI state activation MAC CE, the UE repeats Step 12-20.

In case where in Step 12-20, the MAC CE received by the UE indicates activation of two TCI states for the PDCCH reception (a determination is made through a new MAC CE and LCID), in Step 12-35, the UE may determine whether the MAC CE is applicable to only one serving cell or to a plurality of carriers, depending on whether or not the serving cell indicated in the MAC CE is contained in the serving cell lists (simultaneousTCI-UpdateList1 and simultaneousTCI-UpdateList2) for a preconfigured RRC. In case where the simultaneous activation with respect to the plurality of carriers is indicated, by applying the two TCI states indicated in the received MAC CE, the activation may be performed using TCI states indicated with respect to all cells in the serving cell lists (simultaneousTCI-UpdateList1 and simultaneousTCI-UpdateList2) configured through the RRC. In Step 12-40, the UE may receive the PDCCH through the configured beam. In addition, in case where the UE again receives the TCI state activation MAC CE, the UE repeats Step 12-20.

Figure 13:
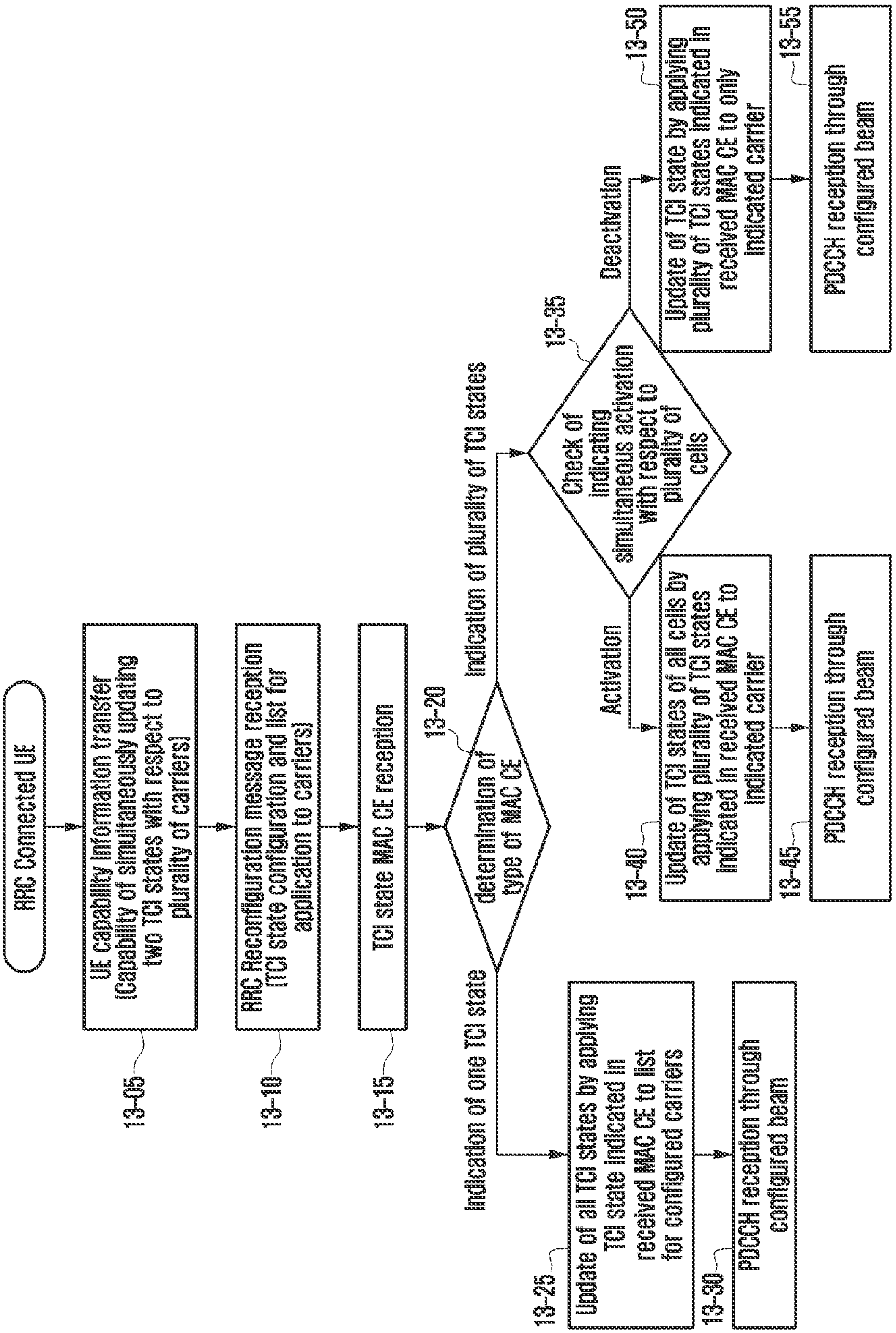
FIG. 13 is a flowchart illustrating, as Embodiment 3 proposed in the present disclosure, a (2-2)-nd method (which maps the corresponding carrier information to the RRC configuration) of activating the TCI states in all carriers simultaneously configured through the two TCI state activation MAC CEs, with respect to the plurality of carriers in the situation where the CA applies.

FIG. 13 is a flowchart illustrating, as Embodiment 3 proposed in the present disclosure, a (2-2)-nd method (which maps the corresponding carrier information to the RRC configuration) of activating the TCI states in all carriers simultaneously configured through the two TCI state activation MAC CEs, with respect to the plurality of carriers in the situation where the CA applies.

In Step 13-05, in response to a UE capability request message from the gNB, the UE, which is in a state of establishing an RRC connection, generates and stores UE capability information and delivers the UE capability information to the gNB. Particularly, the UE capability information may contain an indicator indicating whether or not simultaneous activation of two beams with respect to a plurality of carriers is supported. The following two methods are possible as methods for this indication.

First Method of Delivering the UE Capability

By adopting a one-bit indicator, it can be indicated whether or not the UE supports simultaneous activation of two beams with respect to a plurality of carriers. If it is indicated that the UE supports the UE capability, the UE capability may apply to all band combinations (containing both an intra-band BC and an inter-band BC) contained in the UE capability information (with one-bit indicator per UE, UE supports this feature for all supported BCs which UE reports to the gNB).

Second Method of Delivering the UE Capability

An indicator indicating whether or not simultaneous activation of two beams with respect to a plurality of carriers is supported on a basis per band combination supported by the UE may be contained in the UE capability (one-bit indicator per BC i.e. this feature can be supported for the among the CCs in the supported BC including intra-band and inter-band BC).

In Step 13-10, the gNB delivers configuration information (ServingCellConfig) for configuring a plurality of serving cells and TRPs to the UE through an RRC message. The RRC message may contain configuration information (PDCCH-Config and PDSCH-Config) for receiving over a PDCCH and a PDSCH. Particularly, the RRC message contains a BWP configuration (BWP-Uplink and BWP-Downlink), a CORESET configuration, a scrambling configuration, a TCI state (TCI-State in PDCCH-Config and PDSCH-Config) configuration, and the like. Particularly, a configuration associated with the TCI state is provided on a per-serving cell basis and on a per-downlink BWP basis, and each of the configurations associated with the TCI state is contained in PDCCH-Config and PDSCH-Config. A beam configuration for PUCCH resource transfer is also contained in PUCCH-config.

The feature of Embodiment 3 is that in Step 13-10, the cell list, to which simultaneous activation of two beams with respect to the plurality of carriers applies, is used in a manner that shares existing cell lists (simultaneousTCI-UpdateList1 and simultaneousTCI-UpdateList2) that are provided through the RRC message. That is, a TCI state that applies to the serving cell is configured in PDCCH-Config in which a TCI state is configured, and the serving cell lists (simultaneousTCI-UpdateList1 and simultaneousTCI-UpdateList2), to which the same configuration applies, are contained in CellGroupConfig and thus may be enabled to apply for simultaneous activation of two beams with respect to the plurality of carriers.

In Step 13-15, the UE may receive a MAC CE, indicating activation of the TCI state for the PDCCH reception, from the gNB. As illustrated in FIG. 9 and FIGS. 10A to 10D, the MAC CE may activate a plurality of beams actually indicated. Thus, the MAC CE may use the plurality of beams for the PDCCH reception and may receive data based thereon. The feature of Embodiment 3 is that a cell list for simultaneous beam activation with respect to a plurality of cells, which is provided in an existing RRC configuration, is used as is, and that activation of a plurality of beams with respect to a plurality of serving cells is indicated based on the new MAC CE described above. In Step 13-15, the UE may receive a MAC CE indicating activation of one beam previously defined or may also receive a MAC CE indicating activation of a plurality of beams newly defined. The two MAC CEs may be enabled to simultaneously apply to one serving cell or a plurality of serving cells according to a configuration. A specific MAC CE structure is the same as described with reference to FIG. 10C, and thus the same description thereof is not provided below.

The UE in Step 13-20 may check the MAC CE received in Step 13-15 and may perform an operation associated with this checking. In case where the received MAC CE indicates activation of one TCI state for the PDCCH reception (a determination is made through an existing MAC CE and LCID), in Step 13-25, the UE may apply a TCI state indicated in the MAC CE to a carrier indicated in the MAC CE and to the CORESET. In case where a serving cell indicated in the MAC CE is contained in a serving cell group list for simultaneous activation, the UE may activate a TCI state with respect to all the serving cells. In Step 13-25, a serving cell and BWP to which the MAC CE is delivered may be one serving cell and BWP that is activated and, as an example, may be a downlink active BWP ID of a PCell. In Step 13-30, the UE may receive a PDCCH through a configured beam. In addition, in case where the UE again receives the TCI state activation MAC CE, the UE repeats Step 13-20.

In case where in Step 13-20, the MAC CE received by the UE indicates activation of two TCI states for the PDCCH reception (a determination is made through a new MAC CE and LCID), in Step 13-35, the UE may determine whether the MAC CE is applicable to only one serving cell or to a plurality of carriers, through a field (an S field 10-115) indicated in the MAC CE. In case where the simultaneous activation with respect to the plurality of carriers is indicated (in case where the S field 10-115 is set to 1), by applying the two TCI states indicated in the received MAC CE, the activation may be performed using TCI states indicated with respect to all cells in the serving cell lists (simultaneousTCI-UpdateList1 and simultaneousTCI-UpdateList2) configured through the RRC. In Step 13-45, the UE may receive the PDCCH through the configured beam. In addition, in case where the UE again receives the TCI state activation MAC CE, the UE repeats Step 13-20.

In case where in Step 13-35, it is indicated that the MAC CE applies to only one serving cell (in case where the S field 10-115 is set to 0), in Step 13-50, the UE performs TCI state activation on the serving cell indicated in the MAC CE. In Step 13-55, the UE may receive the PDCCH through the configured beam. In addition, in case where the UE again receives the TCI state activation MAC CE, the UE repeats Step 13-20.

Figure 14:
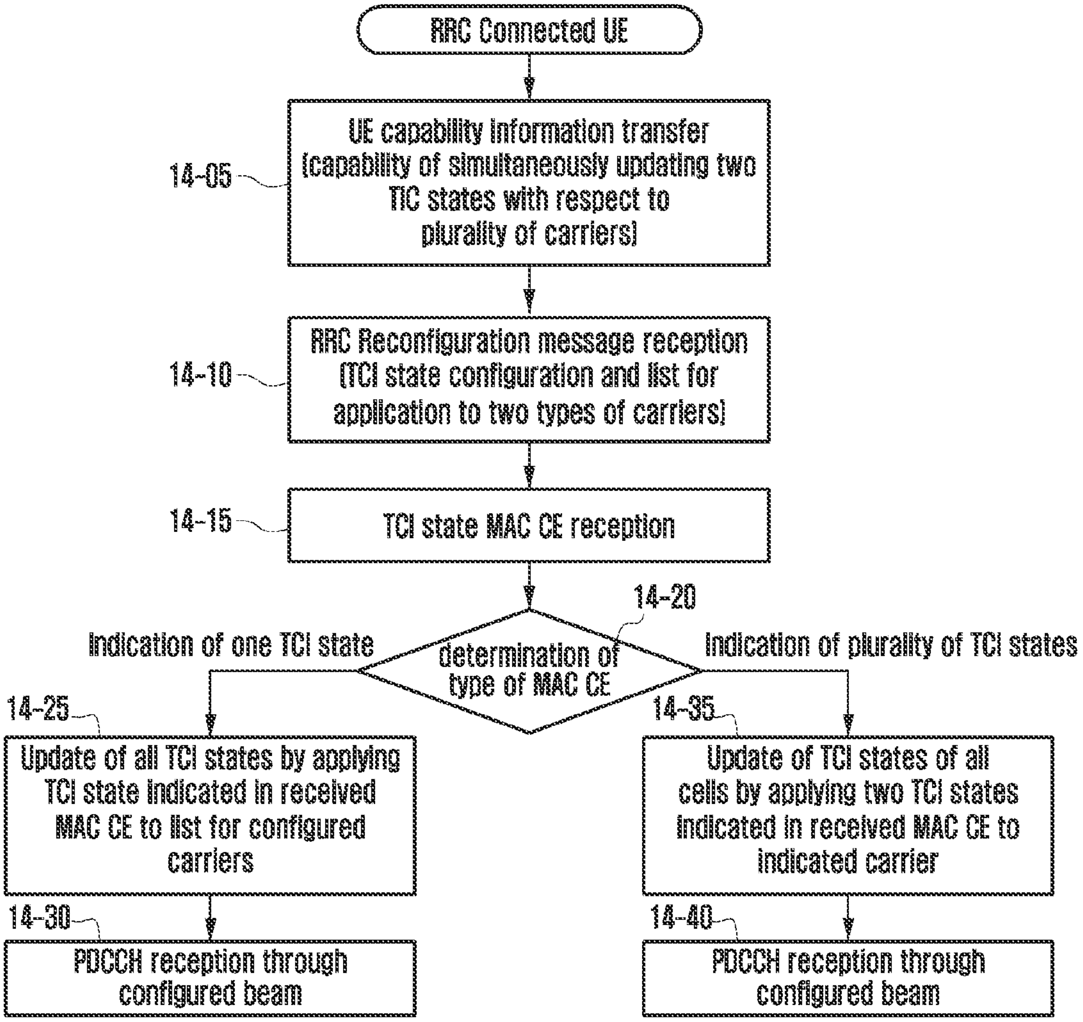
FIG. 14 is a flowchart illustrating, as Embodiment 4 proposed in the present disclosure, a (2-3)-nd method (which maps the corresponding carrier information to the RRC configuration) of activating the TCI states in all carriers simultaneously configured through the two TCI state activation MAC CEs, with respect to the plurality of carriers in the situation where the CA applies.

FIG. 14 is a flowchart illustrating, as Embodiment 4 proposed in the present disclosure, a (2-3)-nd method (which maps the corresponding carrier information to the RRC configuration) of activating the TCI states in all carriers simultaneously configured through the two TCI state activation MAC CEs, with respect to the plurality of carriers in the situation where the CA applies.

In Step 14-05, in response to a UE capability request message from the gNB, the UE, which is in a state of establishing an RRC connection, generates and stores UE capability information and delivers the UE capability information to the gNB. Particularly, the UE capability information may contain an indicator indicating whether or not simultaneous activation of two beams with respect to a plurality of carriers is supported. The following two methods are possible as methods for this indication.

First Method of Delivering the UE Capability

A one-bit indicator is adopted, and, with this indicator, it can be indicated whether or not the UE supports simultaneous activation of two beams with respect to a plurality of carriers. If it is indicated that the UE supports the UE capability, the UE capability may apply to all band combinations (containing both an intra-band BC and an inter-band BC) contained in the UE capability information (with one-bit indicator per UE, UE supports this feature for all supported BCs which UE reports to the gNB).

Second Method of Delivering the UE Capability

An indicator indicating whether or not simultaneous activation of two beams with respect to a plurality of carriers is supported on a basis per band combination supported by the UE may be contained in the UE capability information (one-bit indicator per BC i.e. this feature can be supported for the among the CCs in the supported BC including intra-band and inter-band BC).

In Step 14-10, the gNB delivers configuration information (ServingCellConfig) for configuring a plurality of serving cells and TRPs to the UE through an RRC message. The RRC message may contain configuration information (PDCCH-Config and PDSCH-Config) for receiving over a PDCCH and a PDSCH. Particularly, the RRC message contains a BWP configuration (BWP-Uplink and BWP-Downlink), a CORESET configuration, a scrambling configuration, a TCI state (TCI-State in PDCCH-Config and PDSCH-Config) configuration, and the like. Particularly, a configuration associated with the TCI state is provided on a per-serving cell basis and on a per-downlink BWP basis and is contained in each of PDCCH-Config and PDSCH-Config. A beam configuration for PUCCH resource transfer is also contained in PUCCH-config.

The feature of Embodiment 4 is that in Step 14-10, the cell lists (simultaneousTCI-UpdateList3 and simultaneousTCI-UpdateList4), to which simultaneous activation of two beams with respect to the plurality of carriers applies, are newly provided through the RRC message and are managed independently of the previous cell lists (simultaneousTCI-UpdateList1 and simultaneousTCI-UpdateList2). That is, a TCI state that applies to the serving cell is configured in PDCCH-Config in which a TCI state is configured, and the serving cell lists (simultaneousTCI-UpdateList1 and simultaneousTCI-UpdateList2), to which the same configuration applies, are contained in CellGroupConfig and thus may be enabled to apply for simultaneous activation of two beams with respect to the plurality of carriers.

In Step 14-15, the UE may receive a MAC CE, indicating activation of the TCI state for the PDCCH reception, from the gNB. As illustrated in FIG. 9 and FIGS. 10A to 10D, the MAC CE may activate a plurality of beams actually indicated. Thus, the MAC CE may use the plurality of beams for the PDCCH reception and may receive data based thereon. The feature of Embodiment 4 is that a cell list for simultaneous beam activation with respect to a plurality of cells, which is provided in an existing RRC configuration, is newly defined and that activation of a plurality of beams with respect to a plurality of serving cells is indicated based on the new MAC CE described above. In Step 14-15, the UE may receive a MAC CE indicating activation of one beam previously defined and may also receive a MAC CE indicating activation of a plurality of beams newly defined. The two MAC CEs may be enabled to simultaneously apply to one serving cell or a plurality of serving cells according to a configuration. A specific MAC CE structure is the same as described with reference to FIG. 10D, and thus the same description thereof is not provided below.

The UE in Step 14-20 may check the MAC CE received in Step 14-15 and may perform an operation associated with this checking. In case where the received MAC CE indicates activation of one TCI state for the PDCCH reception (a determination is made through an existing MAC CE and LCID), the UE may apply a TCI state indicated in the MAC CE to a carrier indicated in the MAC CE and to CORESET, in Step 14-25. In case where a serving cell indicated in the MAC CE is contained in a serving cell group list for simultaneous activation, the UE may activate a TCI state with respect to all the serving cells. In Step 14-25, a serving cell and a BWP to which the MAC CE is delivered may be one serving cell and one BWP that are activated and, as an example, may be a downlink active BWP ID of a PCell. In Step 14-30, the UE may receive a PDCCH through a configured beam. In addition, in case where the UE again receives the TCI state activation MAC CE, the UE repeats Step 14-20.

In case where in Step 14-20, the MAC CE received by the UE indicates activation of two TCI states for the PDCCH reception (a determination is made through a new MAC CE and LCID), in Step 14-35, the UE may determine whether the MAC CE is applicable to only one serving cell or to a plurality of carriers, depending on whether or not the serving cell indicated in the MAC CE is contained in the serving cell lists (simultaneousTCI-UpdateList3 and simultaneousTCI-UpdateList4) for a preconfigured RRC. In case where the simultaneous activation with respect to the plurality of carriers is configured, by applying the two TCI states indicated in the received MAC CE, the activation may be performed using TCI states with respect to all cells in the serving cell lists (simultaneousTCI-UpdateList3 and simultaneousTCI-UpdateList4) configured through the RRC. In Step 14-40, the UE may receive the PDCCH through the configured beam. In addition, in case where the UE again receives the TCI state activation MAC CE, the UE repeats Step 14-20.

Figure 15:
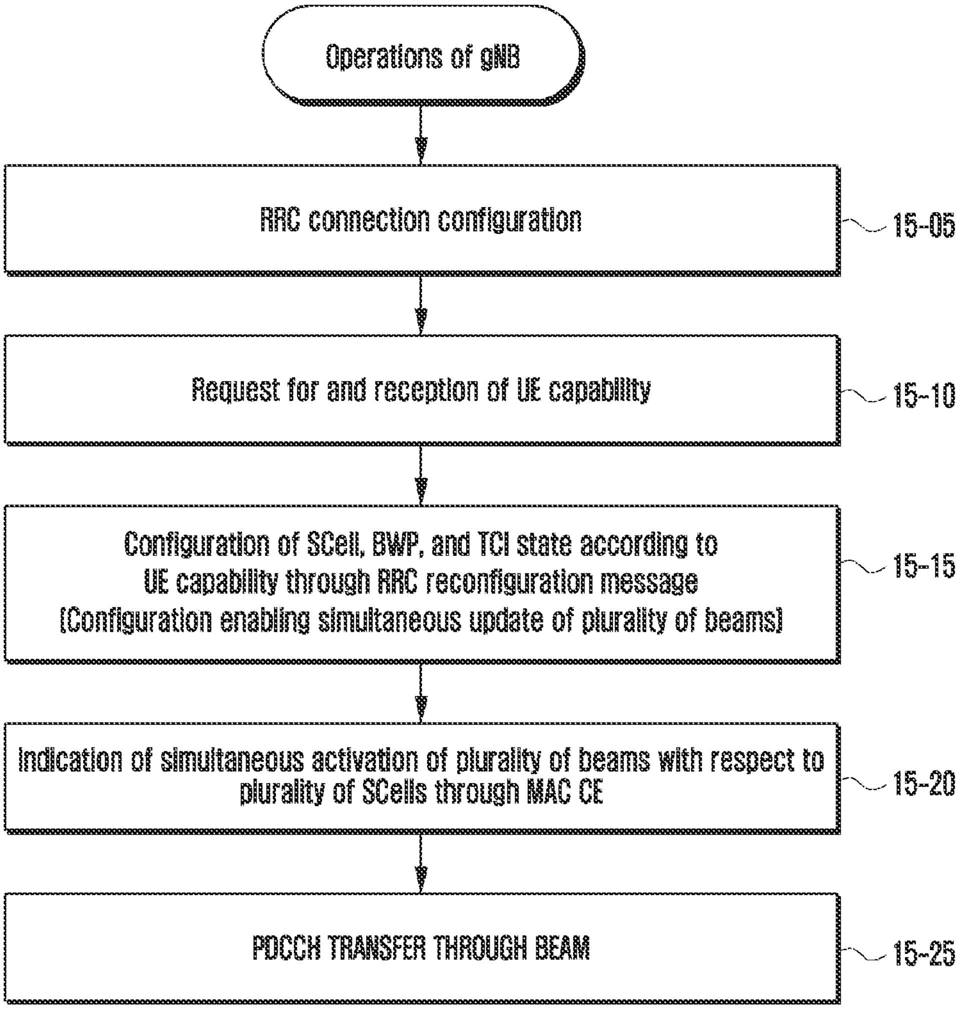
FIG. 15 is a flowchart illustrating overall operations of a gNB in which the embodiments of the present disclosure find application.

FIG. 15 is a flowchart illustrating overall operations of the gNB in which the embodiments of the present disclosure find application.

In Step 15-05, the gNB may establish an RRC connection with the UE. Then, in Step 15-10, the gNB may make a request to the UE for UE capability and may receive the UE capability information. The gNB may check the UE capability information. The UE may determine whether or not it has the capability for an operation for simultaneous activation of a plurality of beams with respect to a plurality of carriers, and may check whether or not the gNB can configure a corresponding function. On the other hand, in case where the gNB already receives the UE capability information for the UE, the gNB may omit Step 15-10. In Step 15-15, the gNB may provide configuration information to the UE through an RRC message. This configuration information, varying with the UE capability, is associated with the capability for the operation for simultaneous activation of the plurality of beams with respect to the plurality of carriers. This configuration information is provided in Embodiments 2, 3, and 4 of the present disclosure. In case of Embodiment 1, additional information may not be provided during the operation described above. That is, in case of Embodiment 1, only an existing cell group list is provided, but a new cell list is not provided. In case where the UE does not have the UE capability, or the gNB determines that a corresponding configuration is not necessary, configuration information necessary for the capability for the operation for simultaneous activation of the plurality of beams with respect to the plurality of carriers is not provided. Instead, configuration information for one fundamental TRP operation may be provided.

In Step 15-20, based on PDCCH beam configuration information (containing information on the operation for simultaneous activation of the plurality of beams with respect to the plurality of carriers) configured through the RRC, the gNB delivers and indicates a MAC CE for activation of a plurality of beams with respect to a specific carrier. In Step 15-20, an existing TCI state activation MAC CE may be used. Subsequently, in Step 15-25, the gNB performs an operation of activating the PDCCH reception by a specific serving cell using the indicated TCI state. That is, the gNB updates beam information in use for data communication and uses the updated beam information.

Figure 16:
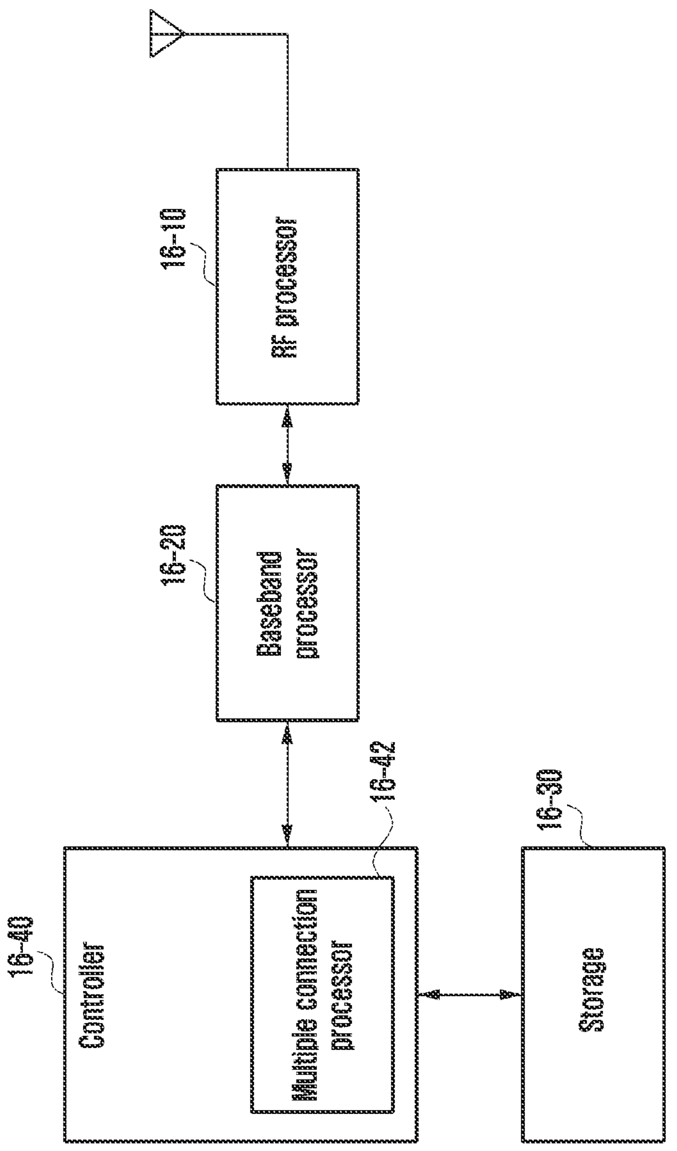
FIG. 16 is a block diagram illustrating an internal structure of a UE in which the present disclosure finds application.

FIG. 16 is a block diagram illustrating an internal structure of the UE in which the present disclosure finds application.

With reference to FIG. 16, the UE includes a radio frequency (RF) processing unit 16-10, a baseband processing unit 16-20, a storage 16-30, and a controller 16-40.

The RF processing unit 16-10 performs functions for transmitting and receiving a signal over a radio channel, such as signal band conversion and signal amplification. That is, the RF processing unit 16-10 up-converts a baseband signal, provided from the baseband processing unit 16-20, into an RF band signal, and then transmits the RF band signal through an antenna. The RF processing unit 16-10 down-converts the RF band signal received through the antenna into a baseband signal. For example, the RF processing unit 16-10 may include a transmission filter, a reception filter, an amplifier, a mixer, an oscillator, a digital-to-analogy converter (DAC), an analogy-to-digital converter (ADC), and the like. In FIG. 16, only one antenna is illustrated, but the UE may include a multiplicity of antennas. In addition, the RF processing unit 16-10 may include a multiplicity of RF chains. Moreover, the RF processing unit 16-10 may perform beamforming. For the beamforming, the RF processing unit 16-10 may adjust the phase and size of each of the signals that are transmitted and received through a multiplicity of antennas or through antenna elements. In addition, the RF processing unit may perform MIMO and may receive many layers when performing a MIMO operation.

The baseband processing unit 16-20 performs a function of converting between a baseband signal and a bit stream according to a physical layer standard for a system. For example, during data transmission, the baseband processing unit 16-20 generates complex symbols by encoding and modulating a transmission bit stream. In addition, during data reception, the baseband processing unit 16-20 restores a reception bit stream by demodulating and decoding the baseband signal that is provided from the RF processing unit 16-10. For example, according to an orthogonal frequency division multiplexing (OFDM) scheme, during the data transmission, the baseband processing unit 16-20 generates complex symbols by encoding and modulating the transmission bit stream, and maps the generated complex symbols to subcarriers. Then, the baseband processing unit 16-20 generates OFDM symbols through an inverse fast Fourier transform (IFFT) operation and cyclic prefix (CP) insertion. In addition, during the data reception, the baseband processing unit 16-20 divides the baseband signal, provided from the RF processing unit 16-10, into OFDM symbol units and restores the signals mapped to the subcarriers through a fast Fourier transform (FFT) operation. Then, the baseband processing unit 16-20 restores the received bit stream through demodulation and decoding.

The baseband processing unit 16-20 and the RF processing unit 16-10, as described above, transmit and receive a signal. Accordingly, the baseband processing unit 16-20 and the RF processing unit 16-10 may each be referred to as a transmitting unit, a reception unit, a transceiver, or a communication unit. Moreover, at least one of the baseband processing unit 16-20 and the RF processing unit 16-10 may include a multiplicity of communication modules in order to support many different radio access technologies. In addition, at least one of the baseband processing unit 16-20 and the RF processing unit 16-10 may include different communication modules in order to process signals in different frequency bands. For example, the different radio access technologies support Wireless LAN standards (for example, IEEE 802.11), cellular network (for example, LTE) standards, and other similar standards. In addition, the different frequency bands may include a super high frequency (SHF) (for example, 2.NRHz, NRhz) band and a millimeter (mm) wave (for example, 60 GHz).

The storage 16-30 stores a basic program for operation of the UE, an application program, and data such as configuration information. Particularly, the storage 16-30 may store information associated with a second access node that performs radio communication using a second radio access technology. Moreover, the storage 16-30 provides data stored at the request of the controller 16-40.

The controller 16-40 controls overall operations of the UE. For example, the controller 16-40 transmits and receives a signal through the baseband processing unit 16-20 and the RF processing unit 16-10. In addition, the controller 16-40 stores data in the storage 16-40 and reads the stored data therefrom. To this end, the controller 16-40 may include at least one processor. For example, the controller 16-40 may include a communication processor (CP) that performs control for communication, and an application processor (AP) that controls a high layer such as an application program.

Figure 17:
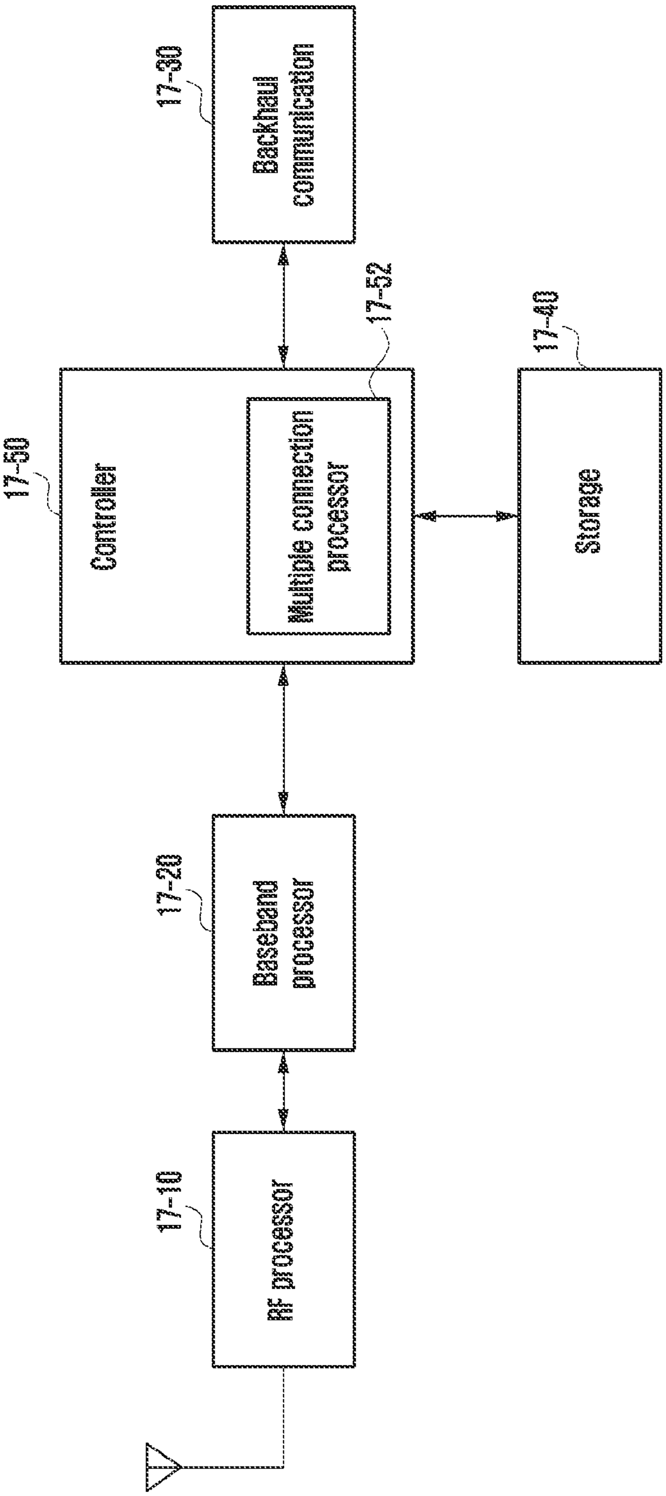
FIG. 17 is a block diagram illustrating constituent elements of an NR gNB according to the present disclosure.

FIG. 17 is a block diagram illustrating constituent elements of the NR gNB according to the present disclosure.

As illustrated in FIG. 17, the gNB is constituted to include an RF processing unit 17-10, a baseband processing 17-20, a backhaul communication unit 17-30, a storage 17-40, and a controller 17-50.

The RF processing unit 17-10 performs functions for transmitting and receiving a signal over a radio channel, such as signal band conversion and signal amplification. That is, the RF processing unit 17-10 up-converts a baseband signal, provided from the baseband processing unit 17-20, into an RF band signal, and then transmits the RF band signal through an antenna. The RF processing unit 17-10 down-converts the RF band signal received through the antenna into a baseband signal. For example, the RF processing unit 17-10 may include a transmission filter, a reception filter, an amplifier, a mixer, an oscillator, a DAC, an ADC, and the like. In FIG. 17, only one antenna is illustrated, but the first access node may include a multiplicity of antennas. In addition, the RF processing unit 17-10 may include a multiplicity of RF chains. Moreover, the RF processing unit 17-10 may perform beamforming. For the beamforming, the RF processing unit 17-10 may adjust the phase and size of each of the signals that are transmitted and received through a multiplicity of antennas or through antenna elements. The RF processing unit 17-10 may perform a downlink MIMO operation by transferring one or more layers.

The baseband processing unit 17-20 performs a function of converting between a baseband signal and a bit stream according to a physical layer standard for a first radio access technology. For example, during the data transmission, the baseband processing unit 17-20 generates complex symbols by encoding and modulating a transmission bit stream. In addition, when performing the data reception, the baseband processing unit 17-20 restores a reception bit stream by demodulating and decoding the baseband signal that is provided from the RF processing unit 17-10. For example, according to the OFDM scheme, during the data transmission, the baseband processing unit 17-20 generates complex symbols by encoding and modulating the transmission bit stream, and maps the generated complex symbols to subcarriers. Then, the baseband processing unit 17-20 generates OFDM symbols through the IFFT operation and the CP insertion. In addition, during the data reception, the baseband processing unit 17-20 divides the baseband signal, provided from the RF processing unit 17-10, into OFDM symbol units and restores the signals mapped to the subcarriers through the FFT operation. Then, the baseband processing unit 17-20 restores the received bit stream through demodulation and decoding. The baseband processing unit 17-20 and the RF processing unit 17-10, as described above, transmit and receive a signal. Accordingly, the baseband processing unit 17-20 and the RF processing unit 17-10 may each be referred to as a transmitting unit, a reception unit, a transceiver, a communication unit, or a wireless communication unit.

The backhaul communication unit 17-30 provides an interface for performing communication with other nodes within a network. That is, the backhaul communication unit 17-30 converts a bit stream, which is transmitted from a primary gNB to a different node, for example, an auxiliary gNB, a core network, and the like, into a physical signal, and converts the physical signal, received from the different node, into a bit stream.

The storage 17-40 stores a basic program for operation of the primary gNB, an application program, and data such as configuration information. Particularly, the storage 17-40 may store information on a bearer allocated to the UE that establishes a connection, measurement results reported from the UE that establishes a connection to the gNB, and the like. In addition, the storage 17-40 may store information that serves as a reference for determining whether to provide or interrupt multiple connections to the UE. Then, the storage 17-40 provides the stored data at the request of the controller 17-50.

The controller 17-50 controls overall operations of the primary gNB. For example, the controller 17-50 transmits or receives signal through the baseband processing unit 17-20 and the RF processing unit 17-10 or through the backhaul communication unit 17-30. In addition, the controller 17-50 stores data in the storage 17-40 and reads the stored data therefrom. To this end, the controller 17-50 may include at least one processor.

The invention claimed is:

1. A method performed by a terminal in a wireless communication system, the method comprising:

receiving, from a base station, a radio resource control (RRC) message containing a first list and a second list that are lists for serving cells to which to apply simultaneously an update of a transmission configuration indicator (TCI) state;

receiving, from the base station, a medium access control (MAC) control element (CE) containing a serving cell identifier (ID), a control resource set (CORESET) ID, and one or two TCI state IDs;

based on a logical channel ID (LCID) associated with the MAC CE, identifying whether the MAC CE is a first MAC CE indicating one TCI state or a second MAC CE indicating two TCI states;

in case that the MAC CE is the first MAC CE, receiving, from the base station, a physical downlink control channel (PDCCH) by applying the one TCI state to all cells in the list in which a serving cell is contained, in case where the serving cell indicated by the MAC CE is contained in the first list or the second list; and in case that the MAC CE is the second MAC CE, receiving, from the base station, the PDCCH by applying the two TCI states to all the cells in the list in which the serving cell is contained, in case where the serving cell indicated by the MAC CE is contained in the first list or the second list, wherein the first list and the second list are used both when the MAC CE is the first MAC CE and when the MAC CE is the second MAC CE.

2. The method of claim 1, wherein PDCCH configuration information is contained in the RRC message, and one or two TCI states are configured on a per-CORESET basis, each CORESET contained in the PDCCH configuration information, and wherein the first list is simultaneousTCI-UpdateList1 and the second list is simultaneousTCI-UpdateList2.

3. The method of claim 1, wherein, when the MAC CE is the first MAC CE, the first MAC CE is applied to all the cells in the list in which the serving cell is contained, and wherein, when the MAC CE is the second MAC CE, the second MAC CE is applied to all the cells in the list in which the serving cell is contained.

4. The method of claim 1, further comprising:

receiving, from the base station, a terminal capability request message; and transmitting, to the base station, terminal capability information containing information indicating whether or not activation of a plurality of beams with respect to a plurality of cells is supported.

5. A method performed by a base station in a wireless communication system, the method comprising:

transmitting, to a terminal, a radio resource control (RRC) message containing a first list and a second list that are lists for serving cells to which to apply simultaneously an update of a transmission configuration indicator (TCI) state;

transmitting, to the terminal, a medium access control (MAC) control element (CE) containing a serving cell identifier (ID), a control resource set (CORESET) ID, and one or two TCI state IDs;

in case that the MAC CE is a first MAC CE indicating one TCI state, transmitting, to the terminal, a physical downlink control channel (PDCCH) by applying the one TCI state to all cells in the list in which a serving cell is contained, in case where the serving cell indicated by the MAC CE is contained in the first list or the second list; and in case that the MAC CE is a second MAC CE indicating two TCI states, transmitting, to the terminal, the PDCCH by applying the two TCI states to all the cells in the list in which the serving cell is contained, in case where the serving cell indicated by the MAC CE is contained in the first list or the second list, wherein whether the MAC CE is the first MAC CE or the second MAC CE is identified based on a logical channel ID (LCID) associated with the MAC CE, and wherein the first list and the second list are used both when the MAC CE is the first MAC CE and when the MAC CE is the second MAC CE.

6. The method of claim 5, wherein PDCCH configuration information is contained in the RRC message, and one or two TCI states are configured on a per-CORESET basis, each CORESET contained in the PDCCH configuration information, and wherein the first list is simultaneousTCI-UpdateList1 and the second list is simultaneousTCI-UpdateList2.

7. The method of claim 5, wherein, when the MAC CE is the first MAC CE, the first MAC CE is applied to all the cells in the list in which the serving cell is contained, and wherein, when the MAC CE is the second MAC CE, the second MAC CE is applied to all the cells in the list in which the serving cell is contained.

8. The method of claim 5, further comprising:

transmitting, to the terminal, a terminal capability request message; and receiving, from the terminal, terminal capability information containing information indicating whether or not activation of a plurality of beams with respect to a plurality of cells is supported.

9. A terminal in a wireless communication system, the terminal comprising:

a transceiver; and a controller coupled with the transceiver and configured to:

receive, from a base station, a radio resource control (RRC) message containing a first list and a second list that are lists for serving cells to which to apply simultaneously an update of a transmission configuration indicator (TCI) state, receive, from the base station, a medium access control (MAC) control element (CE) containing a serving cell identifier (ID), a control resource set (CORESET) ID, and one or two TCI state IDs, based on a logical channel ID (LCID) associated with the MAC CE, identify whether the MAC CE is a first MAC CE indicating one TCI state or a second MAC CE indicating two TCI states, in case that the MAC CE is the first MAC CE, receive, from the base station, a physical downlink control channel (PDCCH) by applying the one TCI state to all cells in the list in which a serving cell is contained, in case where the serving cell indicated by the MAC CE is contained in the first list or the second list, and in case that the MAC CE is the second MAC CE, receive, from the base station, the PDCCH by applying the two TCI states to all the cells in the list in which the serving cell is contained, in case where the serving cell indicated by the MAC CE is contained in the first list or the second list, wherein the first list and the second list are used both when the MAC CE is the first MAC CE and when the MAC CE is the second MAC CE.

10. The terminal of claim 9, wherein PDCCH configuration information is contained in the RRC message, and one or two TCI states are configured on a per-CORESET basis, each CORESET contained in the PDCCH configuration information, and wherein the first list is simultaneousTCI-UpdateList1 and the second list is simultaneousTCI-UpdateList2.

11. The terminal of claim 9, wherein, when the MAC CE is the first MAC CE, the first MAC CE is applied to all the cells in the list in which the serving cell is contained, and wherein, when the MAC CE is the second MAC CE, the second MAC CE is applied to all the cells in the list in which the serving cell is contained.

12. The terminal of claim 9, wherein the controller is further configured to: receive, from the base station, a terminal capability request message, and transmit, to the base station, terminal capability information containing information indicating whether or not activation of a plurality of beams with respect to a plurality of cells is supported.

13. A base station in a wireless communication system, the base station comprising:

a transceiver; and a controller coupled with the transceiver and configured to:

transmit, to a terminal, a radio resource control (RRC) message containing a first list and a second list that are lists for serving cells to which to apply simultaneously an update of a transmission configuration indicator (TCI) state, transmit, to the terminal, a medium access control (MAC) control element (CE) containing a serving cell identifier (ID), a control resource set (CORESET) ID, and one or two TCI state IDs, in case that the MAC CE is a first MAC CE indicating one TCI state, transmit, to the terminal, a physical downlink control channel (PDCCH) by applying the one TCI state to all cells in the list in which a serving cell is contained, in case where the serving cell indicated by the MAC CE is contained in the first list or the second list, and in case that the MAC CE is a second MAC CE indicating two TCI states, transmit, to the terminal, the PDCCH by applying the two TCI states to all the cells in the list in which the serving cell is contained, in case where the serving cell indicated by the MAC CE is contained in the first list or the second list, wherein whether the MAC CE is the first MAC CE or the second MAC CE is identified based on a logical channel ID (LCID) associated with the MAC CE, and wherein the first list and the second list are used both when the MAC CE is the first MAC CE and when the MAC CE is the second MAC CE.

14. The base station of claim 13, wherein PDCCH configuration information is contained in the RRC message, and one or two TCI states are configured on a per-CORESET basis, each CORESET contained in the PDCCH configuration information, wherein, when the MAC CE is the first MAC CE, the first MAC CE is applied to all the cells in the list in which the serving cell is contained, and wherein, when the MAC CE is the second MAC CE, the second MAC CE is applied to all the cells in the list in which the serving cell is contained.

15. The base station of claim 13, wherein the controller is further configured to:

transmit, to the terminal, a terminal capability request message, and receives, from the terminal, terminal capability information containing information indicating whether or not activation of a plurality of beams with respect to a plurality of cells is supported.

* * * * *